United States Patent
Bisbis et al.

(10) Patent No.: US 12,167,811 B2
(45) Date of Patent: Dec. 17, 2024

(54) COFFEE MACHINE WITH ROBOTIC ARMS AND A LIFT TRAVELING BETWEEN PLATFORM LEVELS

(71) Applicant: 7-Eleven, Inc., Irving, TX (US)

(72) Inventors: Jawad Bisbis, Irving, TX (US); Noor Assanie, Lewisville, TX (US); Vivek Malik, Farmers Branch, TX (US)

(73) Assignee: 7-ELEVEN, INC., Irving, TX (US)

( * ) Notice: Subject to any disclaimer, the term of this patent is extended or adjusted under 35 U.S.C. 154(b) by 798 days.

(21) Appl. No.: 17/323,870

(22) Filed: May 18, 2021

(65) Prior Publication Data
US 2022/0369845 A1 Nov. 24, 2022

(51) Int. Cl.
| | | |
|---|---|---|
| *A47J 31/00* | (2006.01) | |
| *A47J 31/40* | (2006.01) | |
| *A47J 31/41* | (2006.01) | |
| *A47J 31/44* | (2006.01) | |
| *A47J 31/52* | (2006.01) | |

(Continued)

(52) U.S. Cl.
CPC ........... *A47J 31/007* (2013.01); *A47J 31/402* (2013.01); *A47J 31/41* (2013.01); *A47J 31/4414* (2013.01); *A47J 31/4425* (2013.01); *A47J 31/4485* (2013.01); *A47J 31/525* (2018.08);
(Continued)

(58) Field of Classification Search
CPC .... A47J 31/4425; A47J 31/41; A47J 31/4414; A47J 31/4485; A47J 31/007; B25J 15/08; B25J 9/0084
See application file for complete search history.

(56) References Cited

U.S. PATENT DOCUMENTS

| | | | | |
|---|---|---|---|---|
| 5,000,345 A | * | 3/1991 | Brogna | G07F 13/10 |
| | | | | 141/141 |
| 2012/0313494 A1 | * | 12/2012 | Chow | A47B 51/00 |
| | | | | 312/298 |

(Continued)

FOREIGN PATENT DOCUMENTS

WO WO-2017078275 A1 * 5/2017 ............. A47J 31/02

OTHER PUBLICATIONS

Bisbis, J. et al., "Coffee Machine Configured to Monitor Multiple Beverage Orders at Various Positions Throughout the Coffee Machine," U.S. Appl. No. 17/323,922, filed May 18, 2021, 63 pages.

(Continued)

*Primary Examiner* — Thien S Tran
(74) *Attorney, Agent, or Firm* — Baker Botts L.L.P.

(57) ABSTRACT

A coffee machine includes a first housing and a second housing, wherein the second housing is disposed on top of the first housing. The second housing comprises a first platform, a second platform disposed below the first platform, and a lift disposed at a first side of the second housing and configured to translate between the first platform and the second platform. The second housing further comprises a first robotic arm disposed above the first platform, a second robotic arm disposed between the second platform and the first platform, and a coffee brewing machine actionable to dispense one or more fluids into a cup. The coffee machine further comprises an information handling system comprising a processor, wherein the processor is configured to actuate the first robotic arm, the second robotic arm, the coffee brewing machine, and the lift.

8 Claims, 13 Drawing Sheets

(51) Int. Cl.
  *A47J 43/044*   (2006.01)
  *B25J 11/00*    (2006.01)
(52) U.S. Cl.
  CPC ......... *A47J 43/044* (2013.01); *B25J 11/0045* (2013.01); *A47J 2043/04472* (2013.01)

(56)           References Cited

U.S. PATENT DOCUMENTS

2019/0069717 A1    3/2019  Yeh
2019/0166872 A1*   6/2019  Mathijssen .............. A23G 9/42
2019/0352161 A1*  11/2019  Knight ............... G06K 19/0723

OTHER PUBLICATIONS

Patent Cooperation Treaty, International Search Report and Written Opinion, International Application No. PCT/US2021/037561, date of mailing Mar. 1, 2022, 21 pages.

* cited by examiner

COFFEE MACHINE WITH ROBOTIC ARMS AND A LIFT TRAVELING BETWEEN PLATFORM LEVELS

TECHNICAL FIELD

This disclosure relates generally to an integrated system for beverage production and tracking, and more particularly to a coffee machine with robotic arms and a lift travelling between platform levels.

BACKGROUND

The physical layout and operations of coffee machines create inefficiencies because they are overly dependent on human interactions. They are also not conducive to preparing and serving multiple cups of coffee efficiently in response to different orders and preferences.

SUMMARY OF THE DISCLOSURE

According to an embodiment, a coffee machine comprises a first housing and a second housing, wherein the first housing comprises a storage compartment and a waste compartment, and wherein the second housing is disposed on top of the first housing. The second housing comprises a first platform comprising a first path configured to allow for the translation of a cup laterally and one or more perpendicular pathways disposed along the first path, wherein there is a designated position at an end of each of the one or more perpendicular pathways. The second housing comprises a second platform disposed below the first platform and comprising a second path configured to allow for the translation of the cup laterally and one or more perpendicular pathways disposed along the second path. The second housing comprises a lift disposed at a first side of the second housing and configured to translate between the first platform and the second platform. The second housing comprises a first robotic arm disposed above the first platform and actionable to grab and release the cup, wherein the first robotic arm is configured to translate the cup laterally along the first path of the first platform and to a particular designated position via the one or more perpendicular pathways. The second housing comprises a second robotic arm disposed between the second platform and the first platform and actionable to grab and release the cup, wherein the second robotic arm is configured to translate the cup laterally along the second path of the second platform and to the designated position via the one or more perpendicular pathways. The second housing comprises a coffee brewing machine, wherein the coffee brewing machine is actionable to dispense one or more fluids into the cup through one or more nozzles when the cup is positioned at a first designated position.

The coffee machine further comprises an information handling system comprising a memory and a processor. The processor is configured to instruct the first robotic arm to close around the cup and to instruct the first robotic arm to displace the cup along the first platform to the first designated position. The processor is further configured to instruct the coffee brewing machine to dispense one or more fluids into the cup when the cup is positioned at the first designated position. The processor is configured to instruct the first robotic arm to displace the cup along the first platform onto the lift and to release the cup, instruct the lift to translate between the first platform and the second platform, instruct the second robotic arm to close around the cup, and to instruct the second robotic arm to displace the cup along the second platform and to release the cup.

According to another embodiment, a method of operating a coffee machine comprises receiving a beverage order from a user through an information handling system, wherein the beverage order corresponds to a cup. The method further comprises actuating a first robotic arm to close around the cup and actuating the first robotic arm to translate the cup laterally along a first path of a first platform and to a particular designated position via one or more perpendicular pathways disposed along the first path. The method comprises dispensing one or more fluids into the cup through one or more nozzles of a coffee brewing machine when the cup is positioned at a first designated position, actuating the first robotic arm to dispose the cup onto a lift, and actuating the lift to vertically translate downwards from the first platform to a second platform. The method further comprises actuating a second robotic arm to close around the cup, actuating the second robotic arm to translate the cup laterally along a second path of a second platform and to a particular designated position on the second platform, and displaying an order number that corresponds to the cup.

Certain embodiments may include none, some, or all of the above technical advantages discussed above. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 14 of the drawings, like numerals being used for like and corresponding parts of the various drawings.

This disclosure contemplates an unconventional, automated coffee machine that can monitor the positions of each cup as a beverage is being prepared. The coffee machine uses an information handling system to determine the position and order in which each cup is moved throughout the coffee machine. The coffee machine further uses a first robotic arm, a second robotic arm, and a lift to move each cup to various designated positions throughout the coffee machine. The system will be described in more detail using FIGS. 1-14.

Coffee Machine Overview

Figure 1:
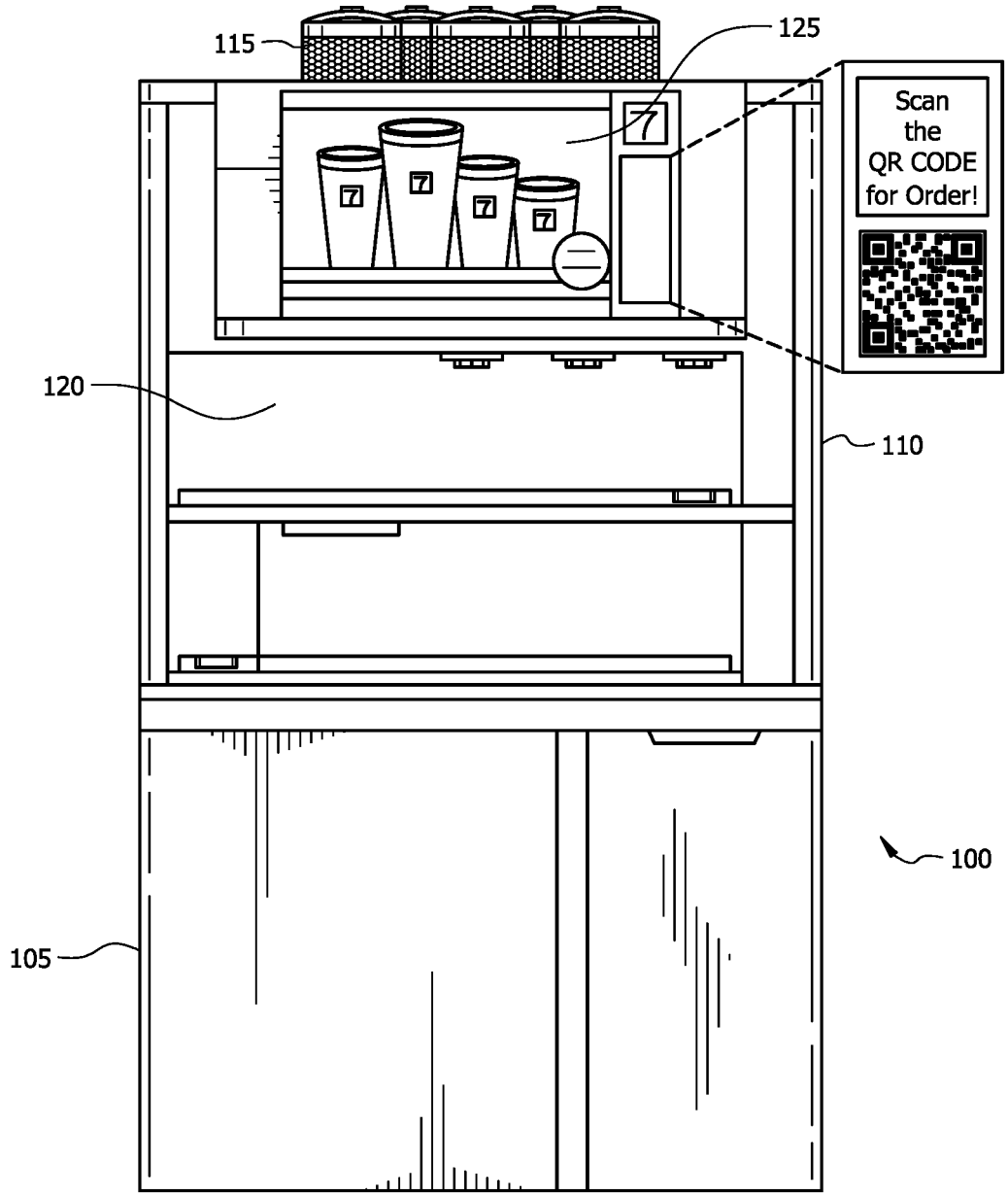
FIG. 1 illustrates one embodiment of a coffee machine according to the present disclosure.

FIG. 1 illustrates an example coffee machine 100. In one or more embodiments, the coffee machine 100 may be installed in a store space so that shoppers within the store space need not engage in the process of making their own beverages manually. Although the example of a store space is used in this disclosure, this disclosure contemplates that the coffee machine 100 may be installed and used in any type of physical space. Generally, after entering the store space, shoppers move around the interior of the store space. The coffee machine 100 may be actuated to produce a beverage for one or more of the shoppers as the shoppers are moving around shopping for other items within the store space. In further embodiments, the coffee machine 100 may notify the one or more shoppers when each beverage is finished being prepared and ready for pick-up.

The coffee machine 100 may be any suitable size, height, shape, and any combination thereof. In the illustrated embodiments, the coffee machine 100 may generally have a rectangular shape, but the coffee machine 100 is not limited to such a shape. The height of the coffee machine 100 may be in a range from about 3 feet to about 8 feet, the width of the coffee machine 100 may be in a range from about 3 feet to about 8 feet, and the depth of the coffee machine 100 may be in a range from about 1 foot to about 6 feet. In a particular embodiment, the height, width, and depth of the coffee machine 100 may be about 6 feet, 4 feet, and 3 feet, respectively. The coffee machine 100 may comprise any suitable materials, including, but not limited to, metals, nonmetals, polymers, rubbers, composites, ceramics, and any combination thereof.

As illustrated, the coffee machine 100 may comprise a first housing 105, a second housing 110, one or more bean tanks 115, a glass partition 120, and an information handling system 125. Both the first housing 105 and the second housing 110 may be configured to house and/or contain internal components of the coffee machine 100. The second housing 110 may be disposed on top of and coupled to the first housing 105, wherein the first housing 105 may be disposed on top of a ground or base surface. As illustrated in FIG. 1, the one or more bean tanks 115 may be disposed on top of and partially within the second housing 110. The one or more bean tanks 115 may be configured to house and/or contain any suitable material to be fed into the second housing 110 of the coffee machine 100. In certain embodiments, the one or more bean tanks 115 may contain whole and/or ground coffee beans. As illustrated, the glass partition 120 may be disposed along a side surface of the second housing 110. The glass partition 120 may be configured to protect at least a portion of the interior of the second housing 110 from an external environment. The glass partition 120 may be at least partially translucent so as to allow a shopper to see into a portion of the interior of the second housing 110.

The information handling system 125 may be disposed at any suitable location about the coffee machine 100. The information handling system 125 may be configured to receive user input information and actuate the components of the coffee machine 100 to produce a beverage based, at least in part, on the user input information. The components of information handling system 125 and their operation will be described in more detail using FIGS. 13-14.

First Housing

Figure 2:
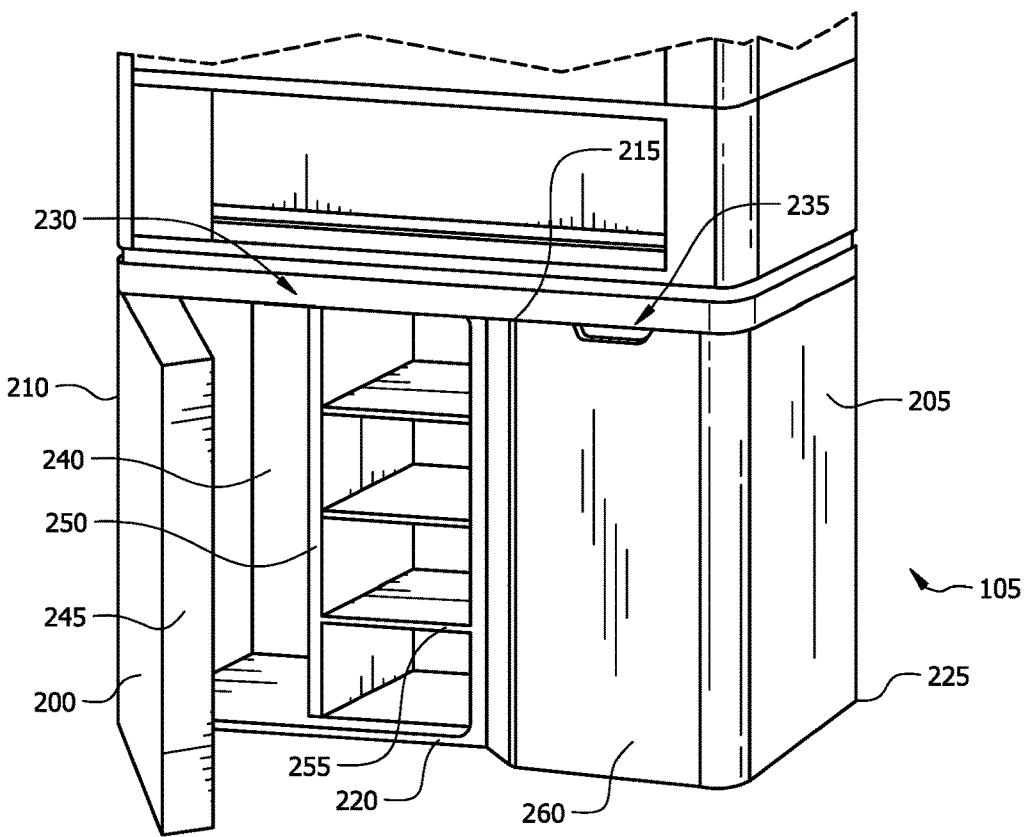
FIG. 2 illustrates a first perspective view of one embodiment of a first housing of the coffee machine illustrated in FIG. 1.

The coffee machine 100 includes the first housing 105, which will be described in more detail in FIGS. 2-4. FIG. 2 illustrates a perspective view of an example first housing 105. The first housing 105 may be any suitable size, height, shape, and any combination thereof. The first housing 105 may comprise any suitable materials, including, but not limited to, metals, nonmetals, polymers, rubbers, composites, ceramics, and any combination thereof. As illustrated, the first housing 105 may comprise a front surface 200, a first side surface 205, a second side surface 210, a top end 215, a bottom end 220, a back surface 225, a storage compartment 230, and a waste compartment 235. The top end 215 and the bottom end 220 may be coupled together through the front surface 200, the first side surface 205, the second side surface 210, and the back surface 225. The first side surface 205 and the second side surface 210 may be disposed opposite and parallel to each other. The front surface 200 and the back surface 225 may also be disposed opposite and parallel to each other. Both the first side surface 205 and the second side surface 210 may be disposed perpendicular to the front surface 200 and the back surface 225.

As illustrated, the storage compartment 230 may be disposed adjacent to and to the left of the waste compartment 235. Alternatively, the storage compartment 230 may be disposed to the right of, behind, in front of, above, or below the waste compartment 235. An interior 240 of the storage compartment 230 may be accessible through a storage door 245, wherein the storage door 245 may be disposed parallel to the front surface 200 when in a closed position. For example, the storage door 245 may be positioned flush with the front surface 200 in a closed position and positioned at an angle in relation to the front surface 200 in an open position. There may be a hinge (not shown) coupling the storage door 245 to the second side 210, wherein the storage door 245 may be rotatable about the hinge to be disposed flush with the front surface 200 or to be angled in relation to the front surface 200. The angle between the storage door 245 and the front surface 200 may be any suitable angle within a range from about 1 degree to about 180 degrees. During operations, a user may rotate the storage door 245 about the hinge to access the interior of the storage compartment 230.

The storage compartment 230 may comprise a longitudinal partition 250 and one or more shelves 255. As described below, there may be a third compartment (for example, third compartment 415) configured to contain a gas tank or gas generator disposed within or adjacent to the storage compartment 230. The third compartment may be disposed in any suitable location in relation to both the storage compartment 230 and the waste compartment 235. For example, the third compartment may be disposed between the storage compartment 230 and the waste compartment 235.

As illustrated, the longitudinal partition 250 may be disposed between the bottom end 220 and the top end 215 within the interior of the storage compartment. The longitudinal partition 250 may further be disposed against the back surface 225 and abut the storage door 245 when in a closed position. The one or more shelves 255 may be disposed between the longitudinal partition 250 and either the third compartment or the waste compartment 235. The one or more shelves 255 may also be disposed against the back surface 225 and may be parallel in relation to the longitudinal partition 250. Any suitable number of one or more shelves 255 may be present within the storage compartment 230.

A portion of the front surface 200 may be defined by the storage door 245, and a remaining portion of the front surface 200 may be defined by a waste door 260. The interior of the waste compartment 235 may be accessible through the waste door 260, wherein the waste door 260 may be disposed parallel to the front surface 200. The waste door 260 may be positioned flush with the front surface 200 in a closed position and to be at a distance from and parallel to the front surface 200 in an open position.

Figure 3:
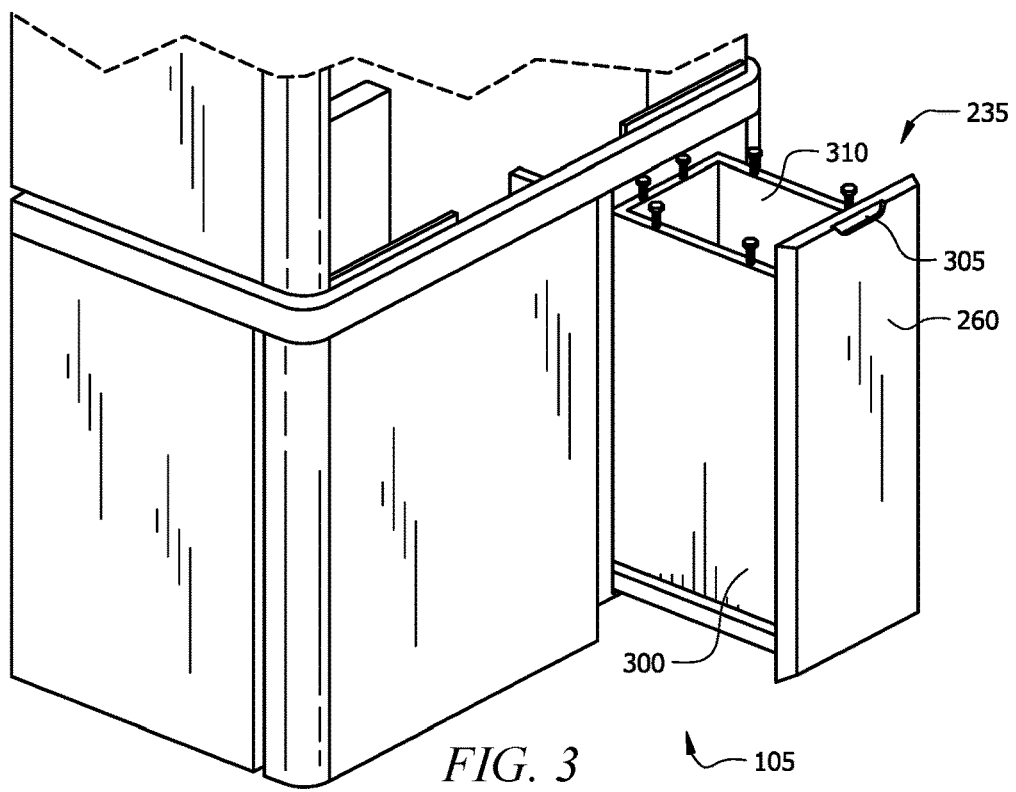
FIG. 3 illustrates a second perspective view of the first housing of the coffee machine illustrated in FIG. 1.

FIG. 3 illustrates a different perspective view of first housing 105. As illustrated, the waste door 260 may be disposed at an end of a drawer 300. In embodiments, a user may actuate the waste door 260, via a handle 305 disposed in the waste door 260, to translate the drawer 300 outwards from the first housing 105 in order to access an interior 310 of the waste compartment 235. The drawer 300 may be actuated to translate out from the first housing 105 by a certain distance. Any suitable bearings, slides, and combinations thereof may be used with the drawer 300. The handle 305 may be disposed at any suitable location in relation to the waste door 260. As illustrated, the handle 305 may be disposed near a top portion of the waste door 260. The handle 305 may be any suitable size, height, shape, and combinations thereof. The handle 305 presently disclosed may be a cut-out in the shape of an oval designed to be gripped by the user. However, any suitable structure configured to transfer a force to an attached structure may be used as the handle 305 (for example, a knob).

Figure 4:
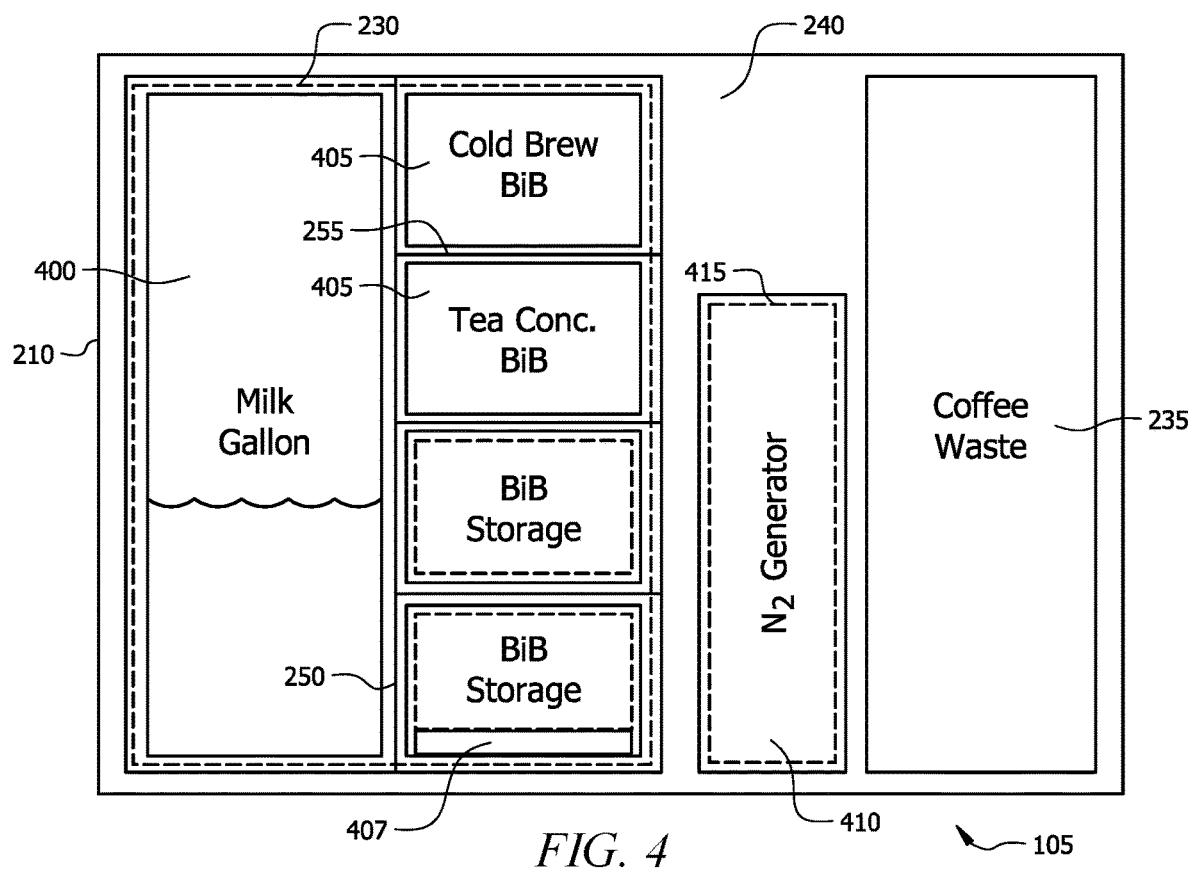
FIG. 4 illustrates exemplary components of the coffee machine illustrated in FIG. 1.

FIG. 4 illustrates exemplary components of the coffee machine 100 illustrated in FIG. 1 that are located in the first housing 105. As illustrated, the storage compartment 230 may contain a first container 400 and a plurality of secondary containers 405. The first container 400 may be disposed in the interior 240 of the storage compartment 230 between the longitudinal partition 250 and the second side surface 210. The first container 400 may be any suitable size, height, shape, and any combination thereof. With regards to the present disclosure, the first container 400 may be configured to contain a fluid, such as, but not limited to milk. Any suitable variation of milk may be contained within the first container 400. The plurality of secondary containers 405 may be disposed in the interior 240 of the storage compartment 230 on the one or more shelves 255. The plurality of secondary containers 405 may be any suitable size, height, shape, and any combination thereof. The plurality of secondary containers 405 may also be configured to contain a fluid. The fluid contained within the plurality of secondary containers 405 may include one or more of coffee, tea, syrups, and any suitable variants of the aforementioned fluids. In one or more embodiments, at least one of the plurality of secondary containers 405 may contain coffee, and at least another one of the plurality of secondary containers 405 may contain tea. Any suitable type of container may be used as the first container 400 and the plurality of secondary containers 405. In certain embodiments, the first container 400 and/or the secondary containers 405 may be a bag-in-box ("BiB") type of container. The BiB type of container generally includes a plastic bladder disposed within a corrugated fiberboard box. The plastic bladder may be any suitable size and/or shape configured to contain a designated volume of fluid. The fiberboard box may have a wide variance in dimensions to accommodate typical storage spaces, wherein a plurality of BiB containers may be disposed together due to a modular design.

There may be a plurality of sensors 407 disposed within the interior 240 of the first housing 105. The plurality of sensors 407 may be configured to measure a parameter of the first container 400 and/or the plurality of secondary containers 405. For example, the plurality of sensors 407 may be configured to measure the weight of a fluid, a rate of change in weight over time, the volume of a fluid, a rate of change in volume over time, temperature, pressure, and any combinations thereof of the first container 400 and/or the plurality of secondary containers 405. The plurality of sensors 407 may be any suitable sensor including a weight sensor, an ultrasonic sensor, a volume sensor, and the like. Each of the plurality of sensors 407 may be disposed about any suitable location in relation to the first container 400 and/or the plurality of secondary containers 405 such as, but not limited to, underneath, on top of, at a side of, at a distance of, and any combinations thereof of the first container 400 and/or the plurality of secondary containers 405. According to the present disclosure, the plurality of sensors 407 may transmit the measurements to the information handling system 125 (referring to FIG. 1), wherein the information handling system 125 may monitor the status of each of the first container 400 and/or the plurality of secondary containers 405.

There may be a nitrogen generator 410 disposed within the interior 240 of the first housing 105. The nitrogen generator 410 may be disposed within a third compartment 415 between the storage compartment 230 and the waste compartment 235, wherein the waste compartment 235 may be configured to receive excess waste from the production of a beverage by the coffee machine (referring to FIG. 1). The nitrogen generator 410 may be configured to produce nitrogen gas from the surrounding air and to inject the produced nitrogen gas into one or more fluids previously contained in the plurality of secondary containers 405. Any suitable nitrogen generator may be utilized as the disclosed nitrogen generator 410.

Second Housing

Figure 5:
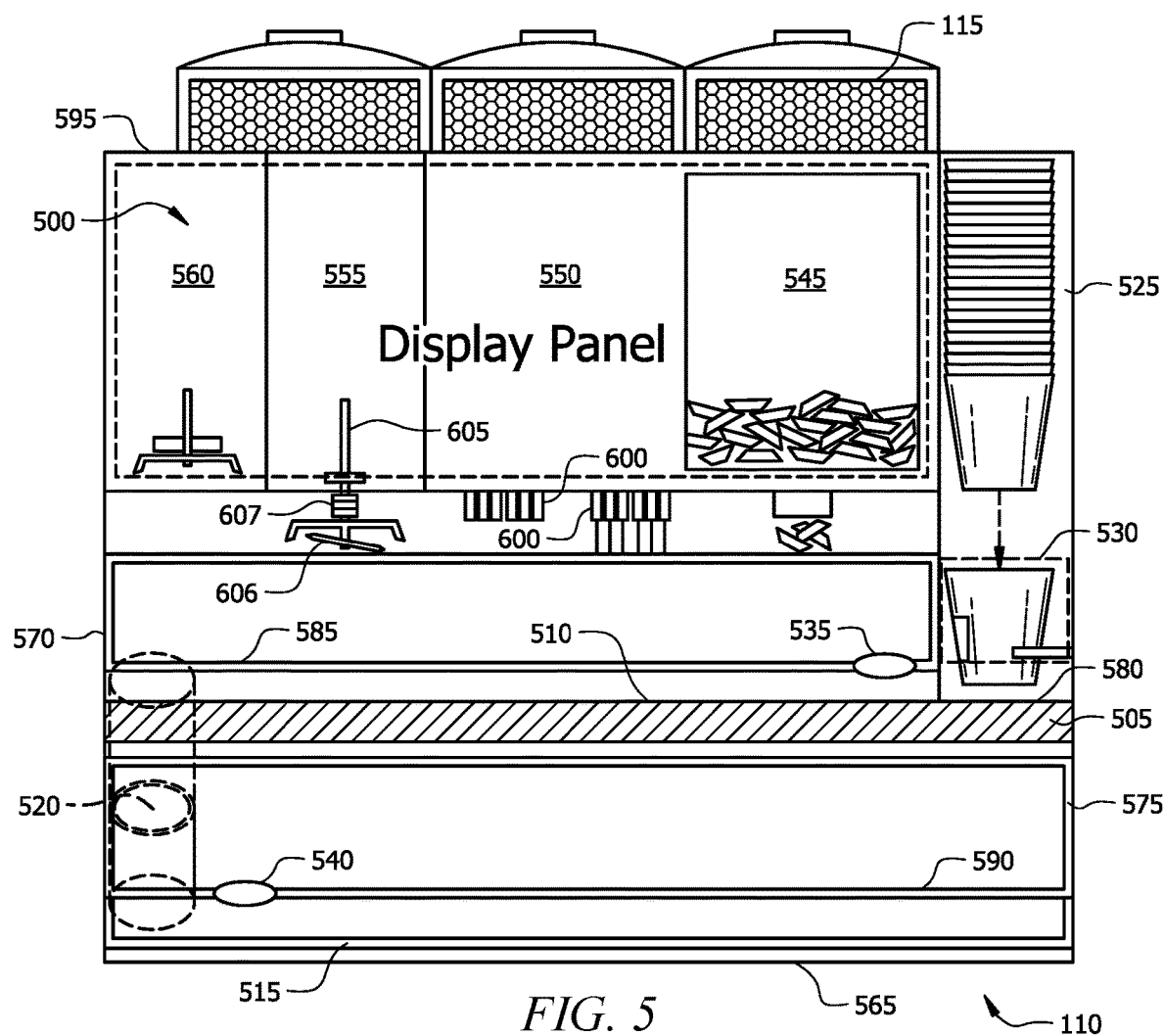
FIG. 5 illustrates one embodiment of a second housing of the coffee machine illustrated in FIG. 1.

Referring back to FIG. 1, the coffee machine 100 includes second housing 110, which will be described in more detail in FIGS. 5-13. FIG. 5 illustrates one embodiment of second housing 110. The second housing 110 may be any suitable size, height, shape, and any combination thereof. The second housing 110 may comprise any suitable materials, including, but not limited to, metals, nonmetals, polymers, rubbers, composites, ceramics, and any combination thereof. As previously disclosed, the second housing 110 may be disposed on top of the first housing 105 (referring to FIG. 1), wherein the one or more bean tanks 115 may be disposed on top of the second housing 110 and will be described in more detail in FIGS. 6A-6B. As illustrated, a primary display 500 of the information handling system 125 (referring to FIG. 1) may be disposed on a front surface of the second housing 110. The primary display 500 may be configured to display a selection of beverage options that may be produced by the coffee machine 100. There may further be a secondary display 505 of the information handling system 125 disposed below the primary display 500, wherein the glass partition 120 (referring to FIG. 1) separates the two. The secondary display 505 may be configured to display an order number corresponding to a designated cup. The components of information handling system 125, including the primary display 500 and the secondary display 505, and their operation will be described in more detail using FIGS. 6-13.

As illustrated, the second housing 110 may comprise a first platform 510, a second platform 515, a lift 520, a cup storage compartment 525, a label machine 530, a first robotic arm 535, a second robotic arm 540, an ice machine 545, a coffee brewing machine 550, a blender housing 555, and a lid storage compartment 560. The first platform 510 and the second platform 515 may be positioned in horizontal planes with relation to the second housing 110 and configured to support one or more cups previously stored within the cup storage compartment 525 and to provide a pathway for the translation of the one or more cups. The first platform 510 may be disposed perpendicular in relation to the glass partition 120 (referring to FIG. 1). The first platform 510 may extend inwards into the second housing 110 from a bottom of the glass partition 120. The second platform 515 may be disposed below the first platform 510 and may define a bottom end 565 of the second housing 110. The length of the second platform 515 may be the same as the width of the second housing 110 defined by a first side 570 and a second side 575. As illustrated, the length of the first platform 510 may be less than the length of the second platform 515 and may be the same as that of the glass partition 120, wherein the first platform 510 may be disposed between the first side 570 of the second housing 110 and the cup storage compartment 525.

The lift 520 may be disposed at the first side 570 of the second housing 110 The lift 520 may be configured to translate between the first platform 510 and the second platform 515. The lift 520 will be described in more detail in FIGS. 13A-13B.

The cup storage compartment 525 may be disposed at the second side 575 of the second housing 110, wherein a bottom end 580 of the cup storage compartment 525 may align with the first platform 510. In embodiments, the label machine 530 may be disposed within the cup storage compartment 525 and may be configured to attach a label to one of the one or more cups contained within the cup storage compartment 525. The cup storage compartment 525 and label machine 530 will be described in more detail in FIG. 7.

The second housing 110 may further comprise a first track 585 and a second track 590. The first track 585 may be a slot disposed at a distance above the first platform 510, where the first robotic arm 535 may be moveably disposed therein. The second track 590 may be a slot disposed at a distance above the second platform 515 and below the first platform 510, where the second robotic arm 540 may be movably disposed therein. The length of the first track 585 may be the same as the length of the first platform 510, and the length of the second track 590 may be the same as the length of the second platform 515. The first track 585 may be configured to provide a path of motion for the first robotic arm 535, and the second track 590 may be configured to provide a path of potion for the second robotic arm 540. The first robotic arm 535 may be configured to grab and displace a cup along the first platform 510; and the second robotic arm 540 may be configured to grab and displace a cup along the second platform 515. With regards to the present disclosure, the first robotic arm 535 and the second robotic arm 540 may comprise the same or similar components and dimensions. As the first robotic arm 535 and the second robotic arm 540 may comprise the same or similar components and dimensions, only the first robotic arm 535 will be described in further detail in FIG. 9.

As illustrated, the ice machine 545, the coffee brewing machine 550, the blender housing 555, and the lid storage compartment 560 may be disposed at a top end 595 of the second housing 110 and behind the primary display 500. The first robotic arm 535 and the first track 580 may be disposed between the first platform 510 and each of the ice machine 545, the coffee brewing machine 550, the blender housing 555, and the lid storage compartment 560. The ice machine 545 may be disposed between the cup storage compartment 525 and the coffee brewing machine 550. The ice machine 545 may be configured to produce ice from water supplied by an external source, crush the produced ice into smaller pieces, dispense the produced ice into a cup disposed beneath the ice machine 545, and any combinations thereof.

The coffee brewing machine 550 may be disposed between the ice machine 545 and the blender housing 555. As disclosed, the coffee brewing machine 550 may be configured to grind coffee beans contained in the one or more bean tanks 115 into coffee grounds and to brew coffee using the coffee grounds. The coffee brewing machine 550 may further be configured to dispense one or more fluids into a cup disposed beneath the coffee brewing machine 550 via one or more nozzles 600. The one or more fluids dispensed may be the coffee brewed by the coffee brewing machine 550, one or more fluids contained in the first housing 105 (referring to FIG. 1), and combinations thereof. The coffee brewing machine 550 is configured to produce any suitable number and combination of coffee drinks, including but not limited to, drip coffee, espresso, latte, cappuccino, French press coffee, etc.

The blender housing 555 may be disposed between the coffee brewing machine 550 and the lid storage compartment 560, wherein the lid storage compartment 560 may be disposed at the first side 570 of the second housing 110. The blender housing 555 may be configured to house a blender 605. Any suitable blender may be used for the blender 605. As illustrated, the blender 605 may comprise a plurality of blades 606 disposed at a distal end 607 of the blender 605, wherein the plurality of blades 606 may be actuated to rotate. There may be any suitable number of blades 606 disposed at the distal end 607 of the blender 605. The blender 605 may be configured to translate vertically from the blender housing 555 down towards the first platform to dispose the plurality of blades 606 into at least a portion of a cup disposed beneath the blender housing 555. The blender 605 may further be configured to actuate the plurality of blades 606 to rotate to blend the contents within the cup, wherein the plurality of blades 606 may reduce any suitable solid components (for example, ice dispensed into the cup) into smaller components. The lid storage compartment 560 may be configured to house a plurality of lids and a lid disposal mechanism. Any suitable lids may be used as the plurality of lids disposed in the lid storage compartment 560. During operations, the plurality of lids may be removed from the lid storage compartment 560 and coupled to a top of each cup disposed underneath. In embodiments, the lid disposal mechanism may be configured to translate vertically from the lid storage compartment 560 down towards the first platform and dispose a lid from the plurality of lids onto a cup disposed beneath the lid storage compartment 560. The information handling system 125 (referring to FIG. 1) may be configured to actuate the ice machine 545, the coffee brewing machine 550, the blender housing 555, the lid storage compartment 560, and any combination thereof.

Figure 6A:
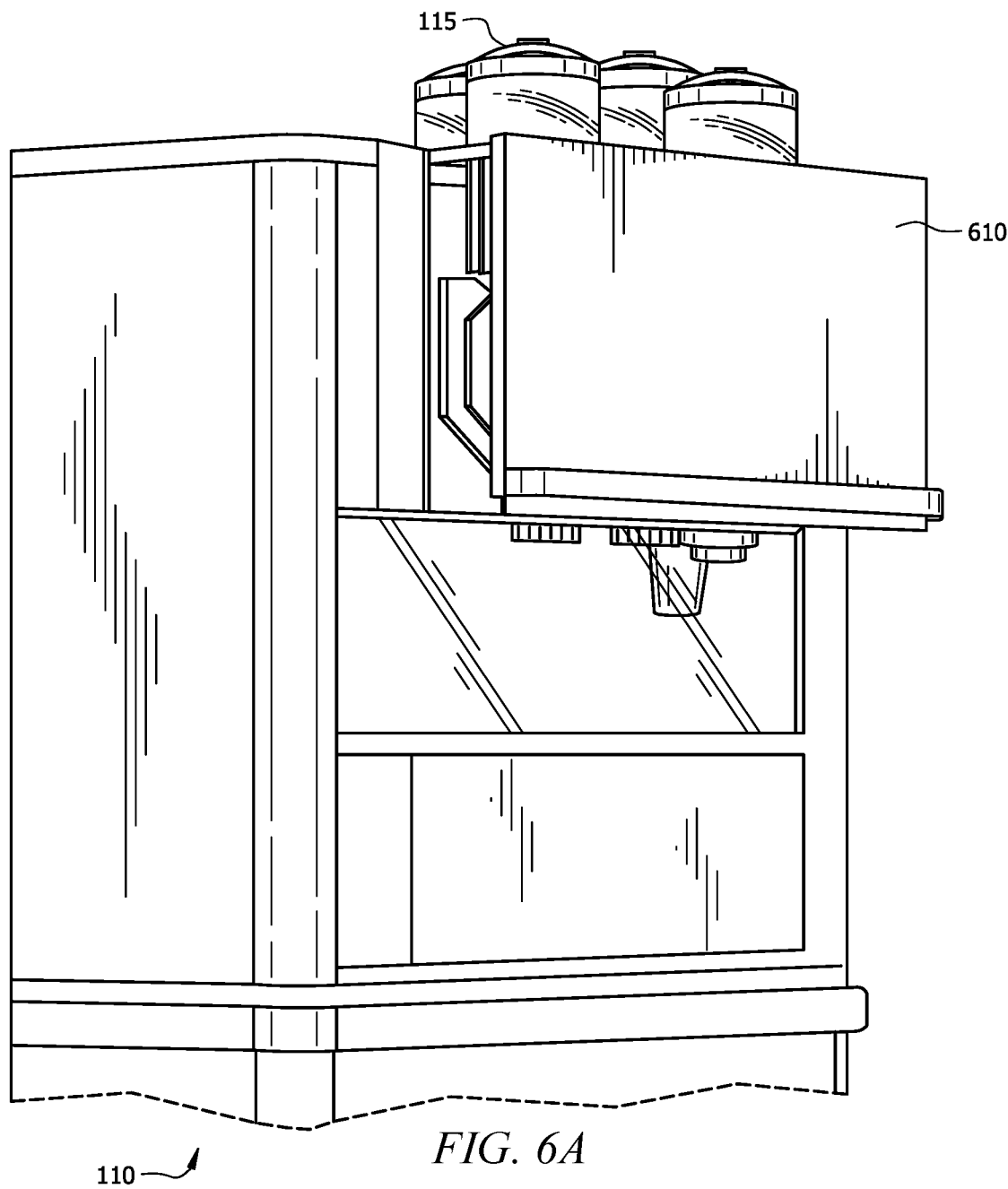
FIG. 6A illustrates one embodiment of a drawer for one or more bean tanks of the coffee machine illustrated in FIG. 1.
Figure 6B:
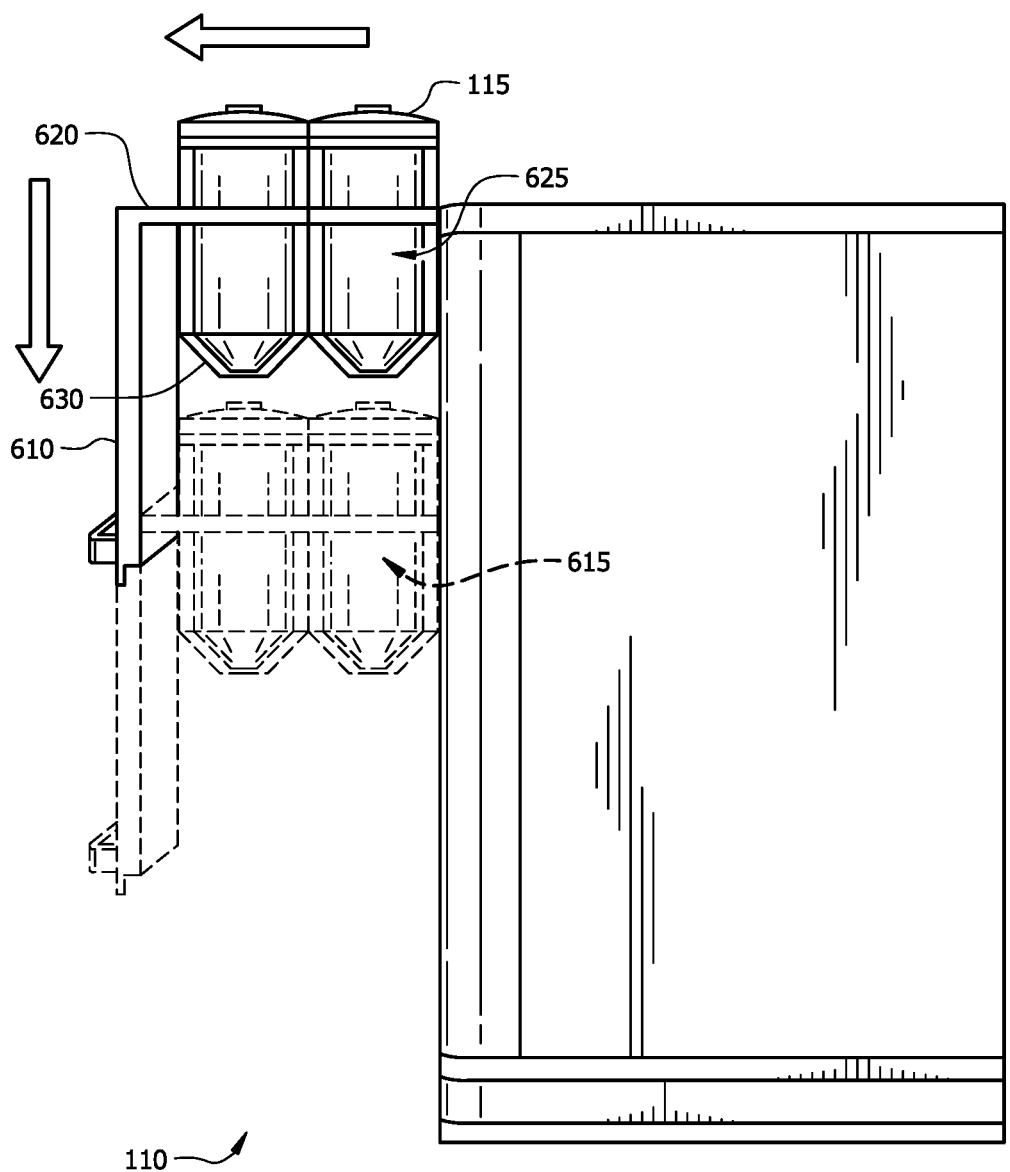
FIG. 6B illustrates one embodiment of a drawer for one or more bean tanks of the coffee machine illustrated in FIG. 1.

FIGS. 6A-6B illustrate an embodiment of a drawer for the one or more bean tanks 115 of the coffee machine 100 illustrated in FIG. 1. With reference to both FIGS. 6A-6B, the second housing 110 may comprise a second housing drawer 610, wherein the second housing drawer 610 may be configured to receive and house the one or more bean tanks 115. The second housing drawer 610 may be configured to translate both in a first path of motion and a second path of motion that is perpendicular to the first path of motion. The first path of motion may be parallel to a depth of the second housing 110, and the second path of motion may be parallel to a height of the second housing 110. During operations, the second housing drawer 610 may extend outward from the second housing 110 along the first path of motion prior to translating downward along the second path of motion. The second housing drawer 610 may be actuated to translate out from the second housing 110 and down by a certain distance. Any suitable bearings, slides, and combinations thereof may be used with the second housing drawer 610 to provide for a means of translation.

As illustrated in FIG. 6B, the second housing drawer 610 may hold a bean tank holder 615. The bean tank holder 615 may be any suitable size, height, shape, and any combination thereof. The bean tank holder 615 may be disposed within the second housing drawer 610 and may be configured to receive at least a portion of the one or more bean tanks 115. The bean tank holder 615 may be disposed in line with or incorporated into a top surface 620 of the second housing drawer 610. The bean tank holder 615 may comprise one or more recesses 625 extending downward from the top surface 620. The one or more recesses 625 may be any suitable size, height, shape, and combinations thereof. In certain embodiments, the one or more recesses 625 may be circular, and there may be an equivalent number of one or more recesses 625 in relation to the number of one or more bean tanks 115. At least a portion of each of the one or more recesses 625 may have a constant diameter. A remaining portion of each of the one or more recesses 625 may have a decreasing diameter as the length increases, thereby forming a funnel 630 opposite to the top surface 620. There may further be an opening (not shown) formed at the bottom of each funnel 630 providing communication between the one or more bean tanks 115 and the interior of the second housing 110.

Figure 7:
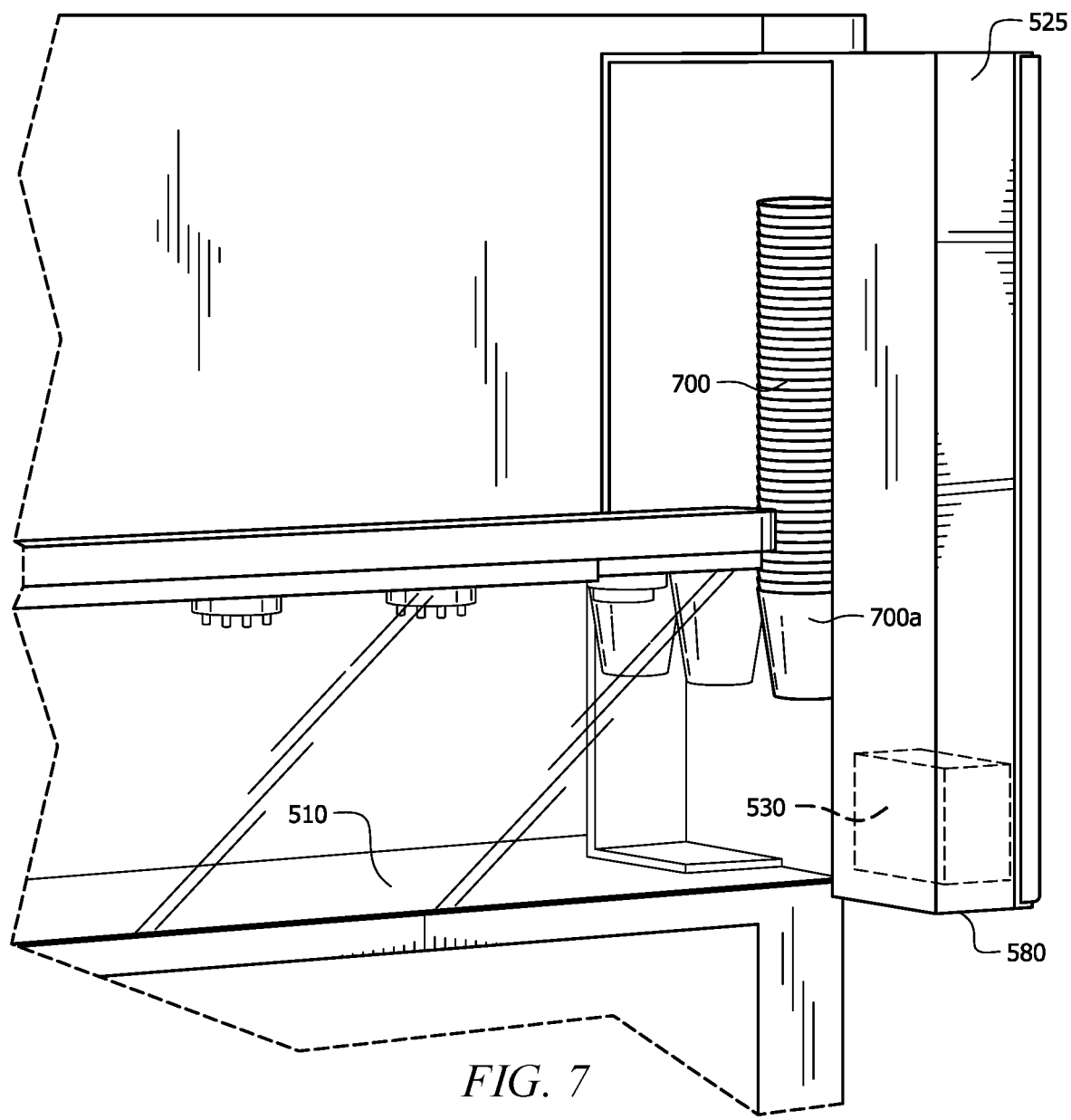
FIG. 7 illustrates one embodiment of a cup storage compartment of the coffee machine illustrated in FIG. 1.

FIG. 7 illustrates an embodiment of the cup storage compartment 525 of the coffee machine 100 illustrated in FIG. 1. In certain embodiments, there may be one or more cups 700 stacked in one or more columns. The columns may be organized by size, shape, and any combinations thereof. During operation of coffee machine 100, there may be a cup translating mechanism configured to remove a first cup 700a from the one or more cups 700 that are stacked in columns and to dispose the first cup 700a in line with the label machine 530. For example, a robotic arm with structural components, such as fingers, capable of gripping an object may be suitable for use as the cup translating mechanism. The cup translating mechanism may be any suitable size, height, shape, and combinations thereof. The cup translating mechanism may be configured to translate horizontally, vertically, and combinations thereof while grasping one or more cups 700. In certain embodiments, the cup translating mechanism may be actuated to at least partially close around the first cup 700a and to disengage the first cup 700a from the remaining one or more cups 700. The cup translating mechanism may further be actuated to dispose the first cup 700a near the label machine 530 and to release the first cup 700a once it is aligned with the label machine 530. As an example, the label machine 530 may be a structure capable of printing labels and a robotic arm, wherein the robotic arm has a label attacher disposed at a distal end capable removing the label from the structure and applying the label to the cup. As illustrated, the label machine 530 may be disposed at the bottom end 580 of the cup storage compartment 525 in front of a vertical plane of the physical location of the stacks of one or more cups 700. The label machine 530 may be disposed at any other suitable location within or around the cup storage compartment 525. When the first cup 700a is positioned correctly in relation to the label machine 530, the label machine 530 may be actuated to attach a label to the first cup 700a. Once a label has been attached to the first cup 700a with the label machine 530, the cup translating mechanism may be actuated to dispose the first cup 700a onto the first platform 510. This process may be subsequently repeated for other cups 700 disposed in columns within the cup storage compartment 525.

Figure 8:
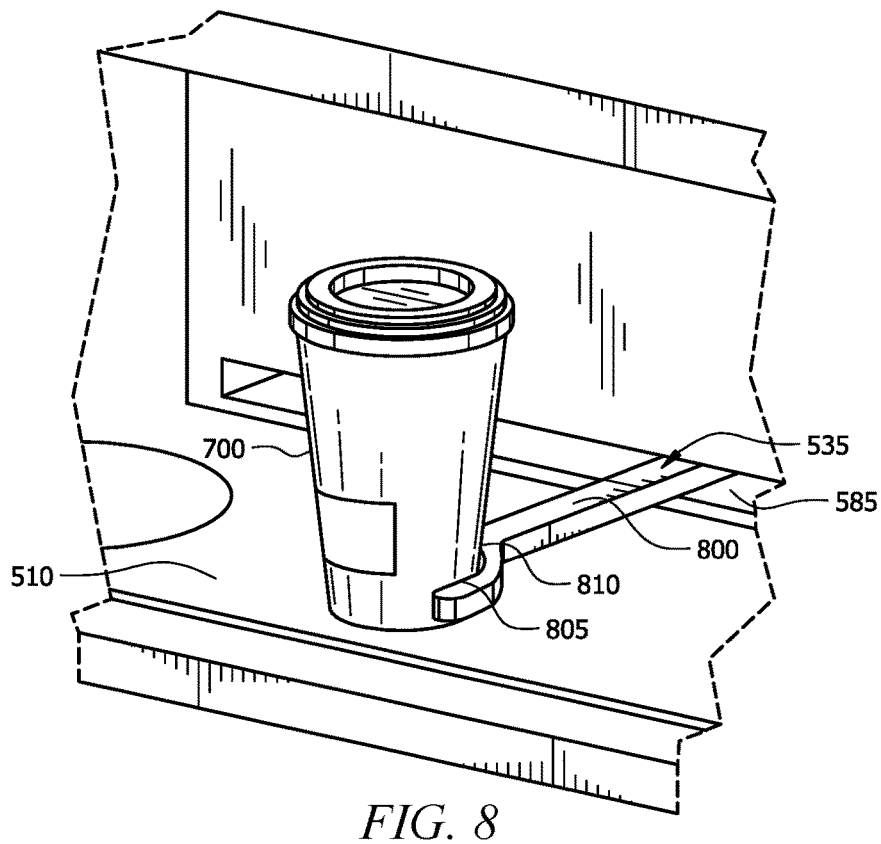
FIG. 8 illustrates one embodiment of a robotic arm used with the coffee machine illustrated in FIG. 1.

FIG. 8 illustrates an embodiment of the first robotic arm 535 used with the coffee machine 100 illustrated in FIG. 1. As previously disclosed, the first robotic arm 535 may be configured to grab and displace one of the one or more cups 700 along the first platform 510. The first robotic arm 535 may be configured to translate horizontally along the first platform 510 via the first track 585. The first robotic arm 535 may further be configured to extend and retract perpendicularly in relation to the first track 585 by a certain distance. The first robotic arm 535 may comprise a primary arm 800 and fingers 805. As illustrated, the fingers 805 may be disposed at a distal end 810 of the primary arm 800, wherein an opposite end of the primary arm 800 may be disposed through the first track 585 and coupled to another component within the second housing 110 (referring to FIG. 1). The fingers 805 may be actuated to open and close around one of the one or more cups 700, wherein the fingers 805 may initially be in an open position. The fingers 805 may be actuated through any suitable means such as with levers and springs. One of ordinary skill in the art will recognize that the operation and configuration of the second robotic arm 540 (referring to FIG. 5) with respect to the second track 590 (referring to FIG. 5) and the second platform 515 (referring to FIG. 5) may be the same or similar as that of the first robotic arm 535 with respect to the first track 585 and the first platform 510.

Figure 9:
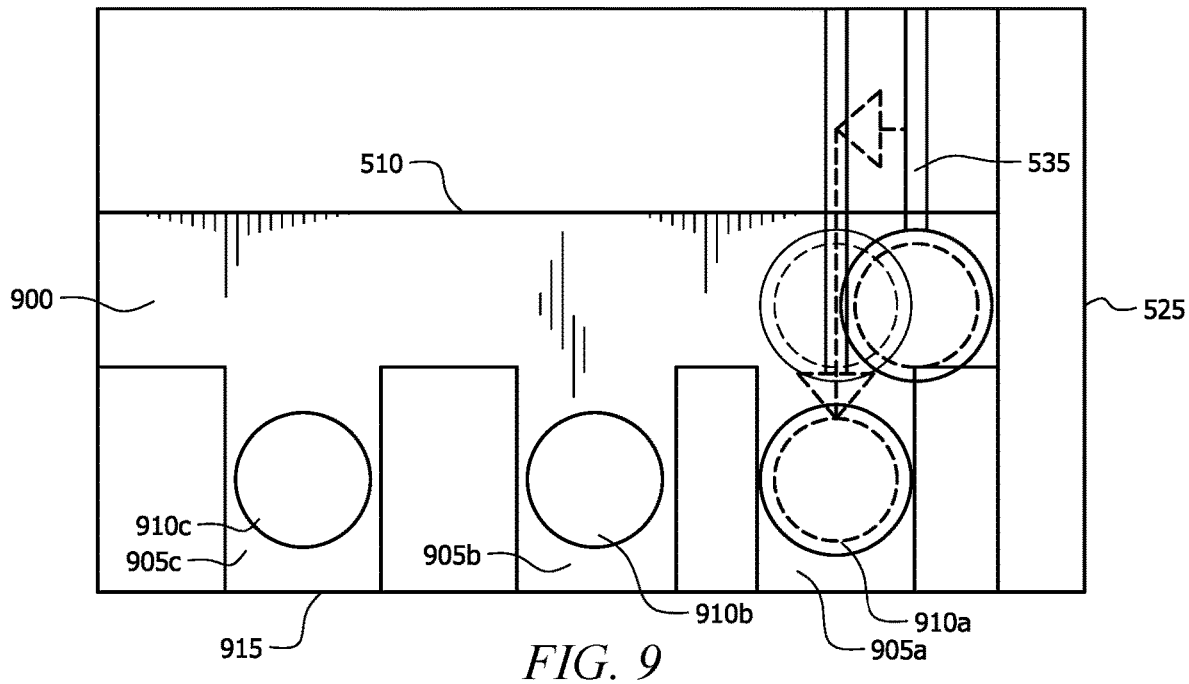
FIG. 9 illustrates one embodiment of a platform of the coffee machine illustrated in FIG. 1.

FIG. 9 illustrates an embodiment of the first platform 510 of the coffee machine 100 illustrated in FIG. 1. As illustrated, the first platform 510 may comprise a first path 900 and one or more perpendicular pathways 905a-c. An end of the first path 900 may be disposed adjacent to the cup storage compartment 525 and may horizontally align with the bottom end 580 (referring to FIG. 5) of the cup storage compartment 525. The lift 520 (referring to FIG. 5) may be disposed at an opposite end of the first path 900 from the cup storage compartment 525. The first path 900 may be a designated space for the one or more cups 700 (referring to FIG. 7) to translate along laterally. The first path 900 may be any suitable size and/or shape to accommodate one or more cups 700. As illustrated, the first pathway 900 may be a rectangular space with a constant width.

The one or more perpendicular pathways 905a-c may be disposed along the first path 900 and extend out from the first path 900. The one or more perpendicular pathways 905a-c may be any suitable size and/or shape to accommodate one or more cups 700. As illustrated, the one or more perpendicular pathways 905a-c may be a rectangular space with a constant width. In certain embodiments, the one or more perpendicular pathways 905a-c may be evenly or uniformly spaced out along the first path 900. There may be a designated position 910 at a distal end 915 of each of the one or more perpendicular pathways 905a-c. The designated position 910 may be a location on the one or more perpendicular pathways 905. A particular designated position 910 may vertically align with an outlet of the ice machine 545 (referring to FIG. 5), one or more nozzles 600 (referring to FIG. 5) of the coffee brewing machine 550 (referring to FIG. 5), the blender 605 (referring to FIG. 5) of the blender housing 555 (referring to FIG. 5), or the lid disposal mechanism of the lid storage compartment 560 (referring to FIG. 5). With reference to FIG. 9, designated position 910a may be disposed underneath the outlet of the ice machine 545, designated position 910b may be disposed underneath the one of the one or more nozzles 600 of the coffee brewing machine 550, and designated position 910c may be disposed underneath another one of the one or more nozzles 600 of the coffee brewing machine 550. During operations, the first robotic arm 535 may be actuated to translate laterally from right to left along the first path 900 and to extend or retract along the one or more perpendicular pathways 905a-c to dispose the one or more cups 700 at one of the designated positions 910a-c. The configuration of the second platform 515 (referring to FIG. 5) may be the same or substantially similar as that of the first platform 510.

Figure 10:
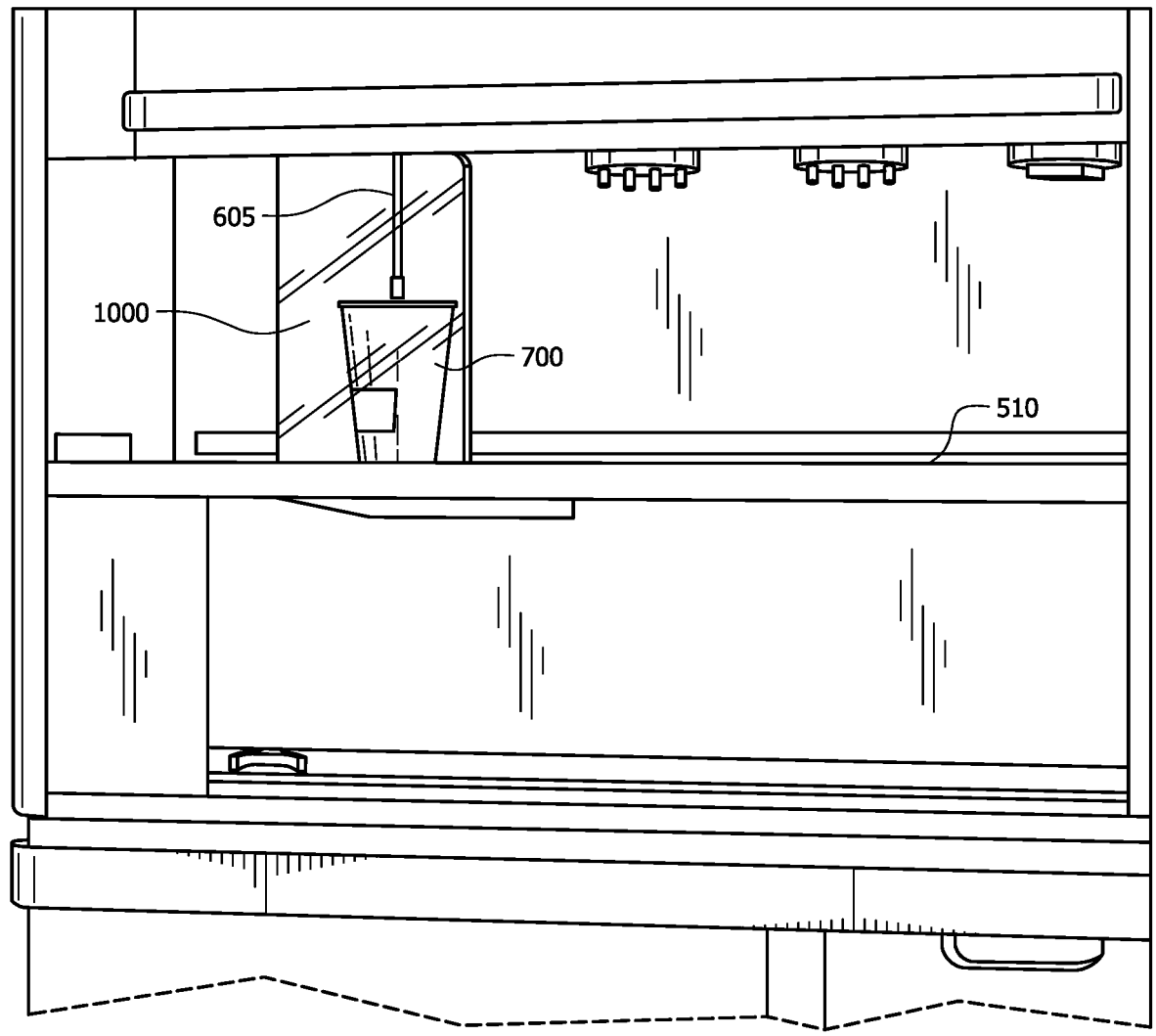
FIG. 10 illustrates one embodiment of a blender of the coffee machine illustrated in FIG. 1.

FIG. 10 illustrates an embodiment of the blender 605 of the coffee machine 100 illustrated in FIG. 1. The first robotic arm 535 (referring to FIG. 5) may have disposed the one of the one or more cups 700 at one of the designated positions 910 (referring to FIG. 9) that is beneath the blender housing 555 (referring to FIG. 5). The blender 605 may be configured to translate vertically down from the blender housing 555 into at least a portion of the one of the one or more cups 700. Any suitable blender or components capable of blending may be used as the blender 605. The blender housing 555 may further contain or house a shield 1000, wherein the shield 1000 may translate downwards with the blender 605.

The shield 1000 may be any suitable size, height, shape, and any combinations thereof. The shield 1000 may further be comprised of any suitable materials. The shield 1000 may translate downwards until coming into contact with the first platform 510. The shield 1000 may be configured to be disposed around the one of the one or more cups 700 disposed at the one of the designated positions 910 and seal against the first platform 510. During operation, the blender 605 may be actuated to rotate the plurality of blades 606 (referring to FIG. 5) to blend any contents within the one of the one or more cups 700. The contents may be blended with such force so as to displace a portion of the contents out of the one of the one or more cups 700. In these embodiments, the portion of the contents displaced out of the one of the one or more cups 700 may contact the shield 1000, wherein the shield 1000 may inhibit further potential motion of the displaced portion of the contents. When the blender 605 stops operating, the blender 605 and the shield 1000 may be actuated to translate upwards back into the blender housing 555. The blender 605 and the shield 1000 may translate at the same time and speed, one may translate after the other has finished translating, or combinations thereof.

Figure 11A:
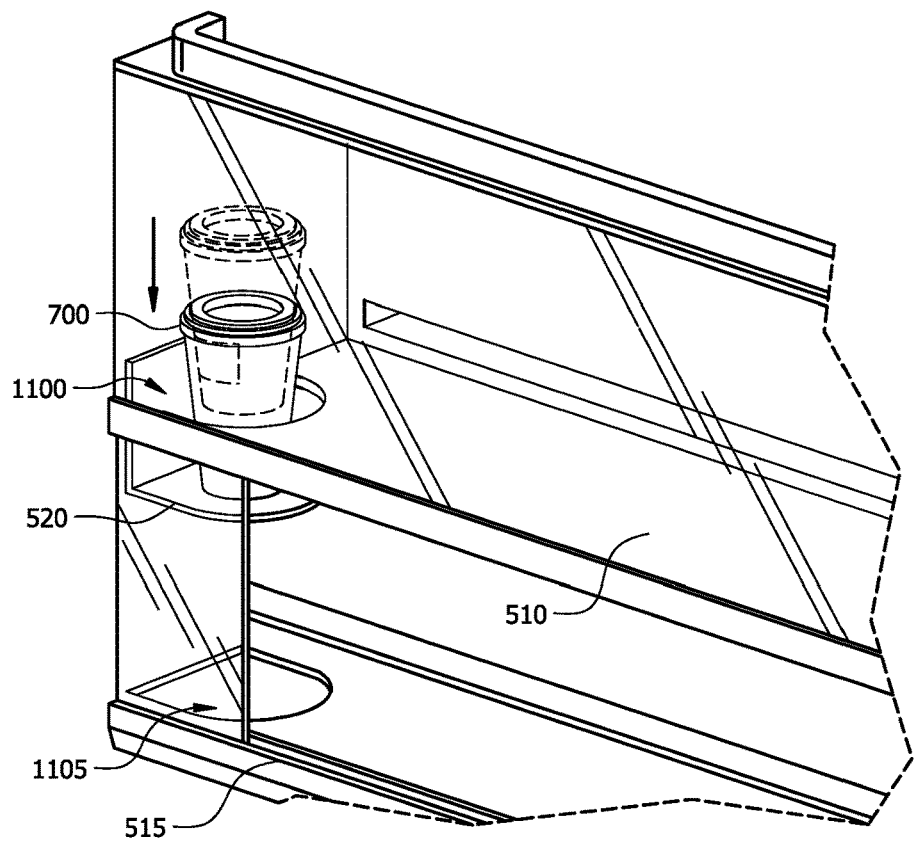
FIG. 11A illustrates one embodiment of a lift mechanism of the coffee machine illustrated in FIG. 1.
Figure 11B:
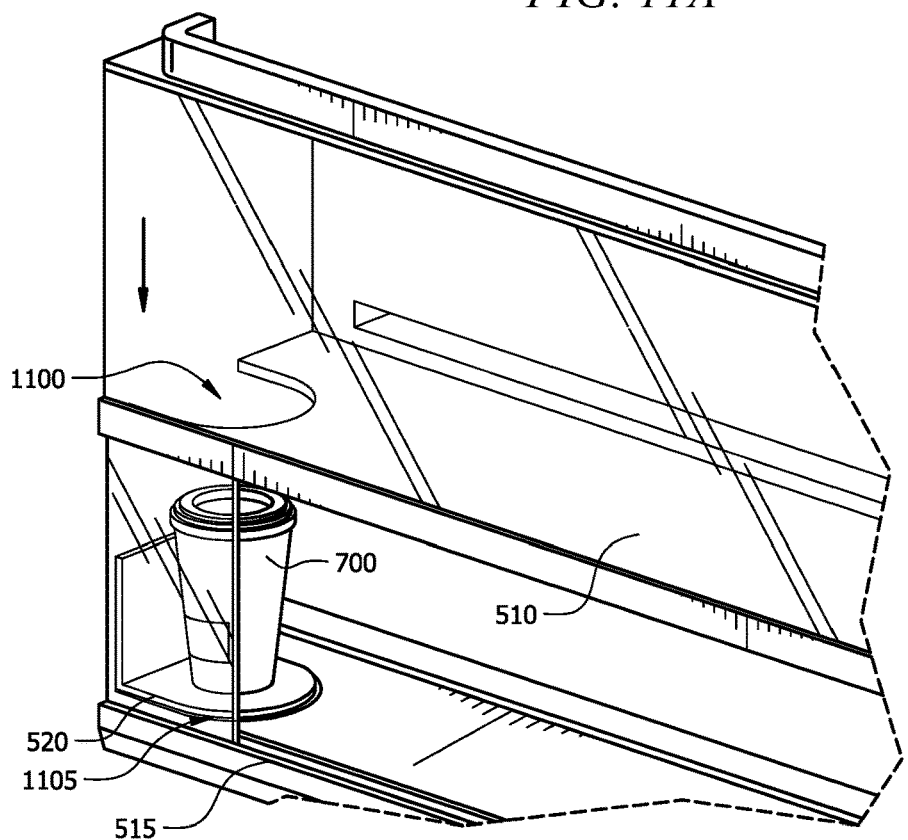
FIG. 11B illustrates the lift mechanism illustrated in FIG. 13A at a different position.

FIG. 11A illustrates an embodiment of the lift 520 of the coffee machine 100 illustrated in FIG. 1. FIG. 11B illustrates the lift 520 illustrated in FIG. 11A at a different position. With reference to both FIGS. 11A-11B, the lift 520 may be a horizontal structure configured to support a load and to translate it in a vertical direction. The lift 520 may be any suitable size, height, shape, and combinations thereof. As illustrated, the lift 520 may comprise a curvilinear shape. There may be an opening 1100 disposed in the first platform 510 that accommodates the shape of the lift 520. There may be a recess 1105 disposed in the second platform 515 configured to receive the lift 520. The lift 520 may be disposed in a first position, wherein the first position is horizontally aligned with the first platform 510 and within the opening 1100. The lift 520 may be actuated to translate from a first position to a second position, wherein the second position is horizontally aligned with the second platform 515 and within the recess 1105. During operation, one of the one or more cups 700 may be disposed on the lift 520 in the first position. The lift 520 may be actuated to translate the one of the one or more cups 700 through the opening 1100 and further down towards the second platform 515. Once the lift 520 is received by the recess 1105, the second robotic arm 540 (referring to FIG. 5) may be actuated to translate the one of the one or more cups 700 off of the lift 520, onto the second platform 515, and further along the second platform 515. Any suitable means of operating the lift 520 may be used, such as with a pulley system, a motor, hydraulics, pneumatic systems, and any combination thereof.

Overall System

Figure 12:
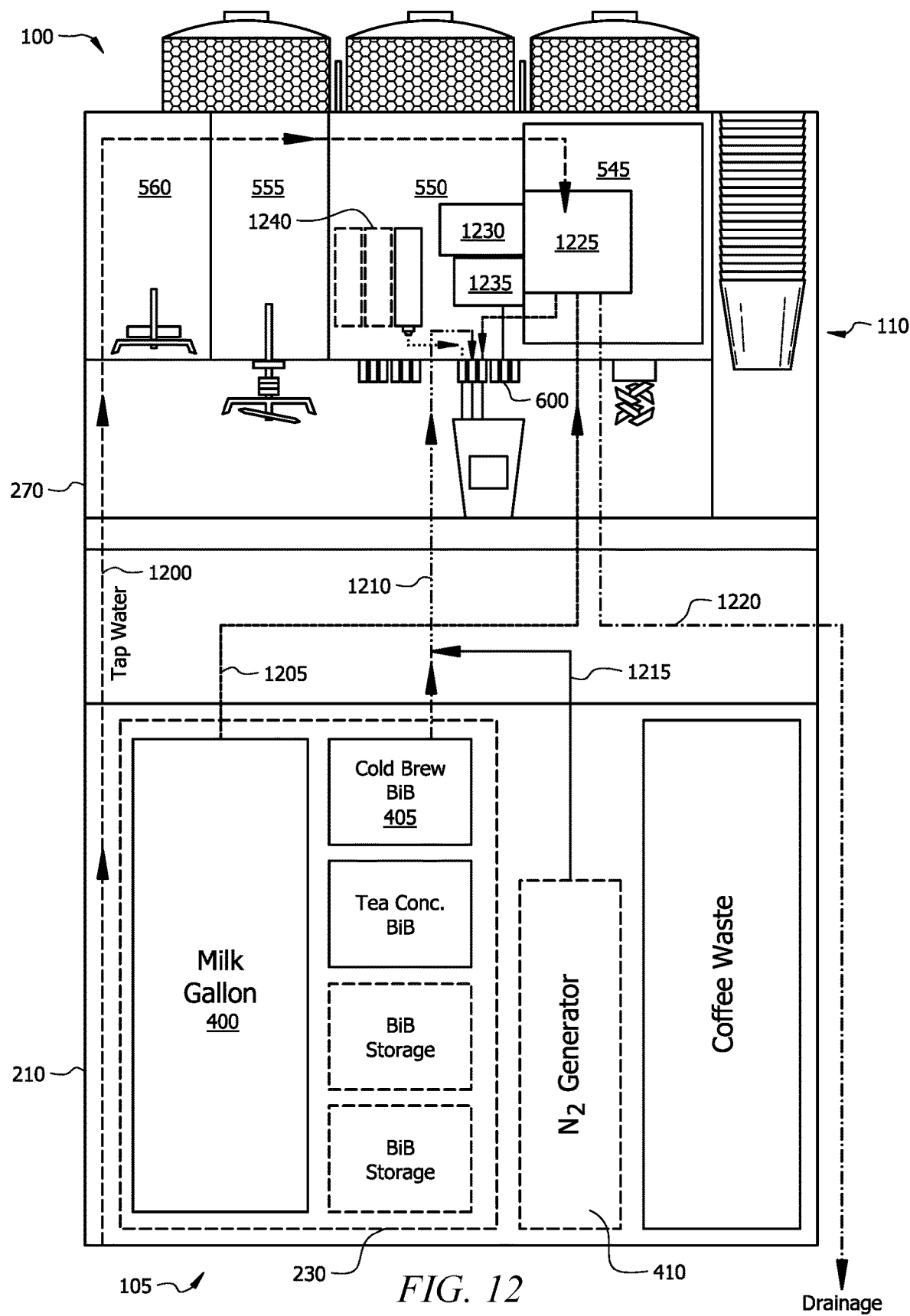
FIG. 12 illustrates exemplary components of the coffee machine illustrated in FIG. 1.

FIG. 12 illustrates exemplary components of the coffee machine 100 illustrated in FIG. 1. As illustrated, components of the first housing 105 may be coupled to components of the second housing 110. In these embodiments, there may be one or more fluid lines disposed throughout the coffee machine 100 coupling the components of the first housing 105 to those of the second housing 110. The one or more fluid lines may comprise an external fluid line 1200, a milk fluid line 1205, a coffee fluid line 1210, a nitrogen fluid line 1215, and a drainage line 1220. The external fluid line 1200 may be any suitable piping and/or conduit capable of facilitating the flow of a fluid. The external fluid line 1200 may be coupled to an external water source on one end and to the ice machine 545 on the opposite end. The external fluid line 1200 may be disposed through the first housing 105 near the first side 210 of the first housing 105, upwards along the first side 570 of the second housing 110, up into the lid storage compartment 560, through the blender housing 555, and through the coffee brewing machine 550 to the ice machine 545. The external fluid line 1200 may be configured to provide water to the ice machine 545 and/or to the coffee brewing machine 550.

The milk fluid line 1205 may be any suitable piping and/or conduit capable of facilitating the flow of a fluid. The milk fluid line 1205 may be coupled to the first container 400 on one end and to the one or more nozzles 600 on the opposite end. The milk fluid line 1205 may be disposed through the storage compartment 230, upwards through the second housing 110, up into the ice machine 545, through the ice machine 545, and into the coffee brewing machine 550 connected to the one or more nozzles 600. The milk fluid line 1205 may be configured to transfer milk from the first container 400 to the ice machine 545 and/or to the coffee brewing machine 550.

As depicted, the ice machine 545 may comprise a reservoir 1225. The reservoir 1225 may be configured to contain a volume of a fluid. The reservoir 1225 may be any suitable size, height, shape, and any combination thereof. The reservoir 1225 may be coupled to the milk fluid line 1205 to receive and output milk during operation of the coffee machine 100. Further, the coffee brewing machine 550 may comprise a steamer 1230 configured to introduce air and apply heat to a fluid. Any suitable steamer may be used as the steamer 1230. The steamer 1230 may be configured to introduce steam into at least a portion of a fluid, such as milk. The steamer 1230 may be at least partially disposed into a volume of milk and configured to inject steam into that volume. As a result, foam may be produced, and the injected steam may further increase the temperature of that volume of milk. In embodiments, as the fluid (for example, milk) flows out of the reservoir 1225 and into the coffee brewing machine 550 along the milk fluid line 1205, the milk fluid line 1205 may direct the flow of the fluid to the steamer 1230. The steamer 1230 may be actuated to introduce air and apply heat to the fluid, and the fluid may continue to flow through the milk fluid line 1205 and be dispensed through the one or more nozzles 600. If the fluid is flowing through the coffee brewing machine 550 while the steamer 1230 is actuated, the fluid may be dispensed through the one or more nozzles 600 at a higher temperature.

The coffee fluid line 1210 may be any suitable piping and/or conduit capable of facilitating the flow of a fluid. The coffee fluid line 1210 may be coupled to the one of the plurality of secondary containers 405 on one end and to the one or more nozzles 600 on the opposite end, wherein the one of the plurality of secondary containers 405 contains coffee. The coffee fluid line 1210 may be disposed through the storage compartment 230, upwards through the second housing 110, up into the coffee brewing machine 550, and out through the one or more nozzles 600. The coffee fluid line 1210 may be configured to transfer coffee from the one of the plurality of secondary containers 405 to the coffee brewing machine 550, wherein the coffee contained in the one of the plurality of secondary containers 405 may be "cold-brew."

As illustrated, the coffee brewing machine 550 may further comprise a receptacle 1235 and one or more syrup containers 1240. The receptacle 1235 may be configured to contain a volume of material. The receptacle 1235 may be any suitable size, height, shape, and any combination thereof. The receptacle 1235 may be coupled to one or more nozzles 600 and output the contained material during operation of the coffee machine 100. The material contained within the receptacle 1235 may be any suitable variant of sugar. The one or more syrup containers 1240 may be configured to contain a volume of a fluid and to dispense the fluid through the one or more nozzles 600. The one or more syrup containers 1240 may be any suitable size, height, shape, and any combination thereof. The one or more syrup containers 1240 may be coupled to the one or more nozzles 600 and output the contained fluid during operation of the coffee machine 100. The fluid contained within the one or more syrup containers 1240 may be any suitable syrup compatible for consumption in beverages.

The nitrogen fluid line 1215 may be any suitable piping and/or conduit capable of allowing the flow of a fluid. The nitrogen fluid line 1215 may be coupled to the nitrogen generator 410 on one end and to the coffee fluid line 1210 on the opposite end. The nitrogen fluid line 1215 may be disposed through the first housing 105 and into the second housing 110 to the coffee fluid line 1210. The nitrogen fluid line 1215 may be configured to introduce nitrogen gas into the flow of fluid within the coffee fluid line 1210, wherein the coffee fluid line may dispense the mixture through the one or more nozzles 600.

The drainage line 1220 may be any suitable piping and/or conduit capable of allowing the flow of a fluid. The drainage line 1220 may be coupled to the reservoir 1225 on one end and to an external coupling (not shown) on the opposite end. The drainage line 1220 may be disposed through the ice machine 545 and through and out the second housing 110 to the external coupling disposed external to the coffee machine 100. The drainage line 1220 may be configured to remove fluid from the reservoir 1225 during a cleaning process. In one or more embodiments, during a cleaning process, water may be introduced into the reservoir 1225, through the external fluid line 1200, when the status of the reservoir 1225 is empty. The present disclosure herein defines the reservoir 1225 being empty as wherein there is not enough fluid present within the reservoir 1225 to provide for an output flow rate greater than zero when actuated to output the fluid. One of ordinary skill in the art would recognize that there may be a negligible amount of fluid, or fluid particles, present in the reservoir 1225. The external fluid line 1200 may provide water to flush out any remaining fluid present within the reservoir 1225 before introducing any subsequent fluids into the reservoir 1225. The mixture of water and any remaining fluid present within the reservoir 1225 may be removed from the reservoir 1225 and the coffee machine 100 through the drainage line 1220.

Information Handling System

Figure 13:
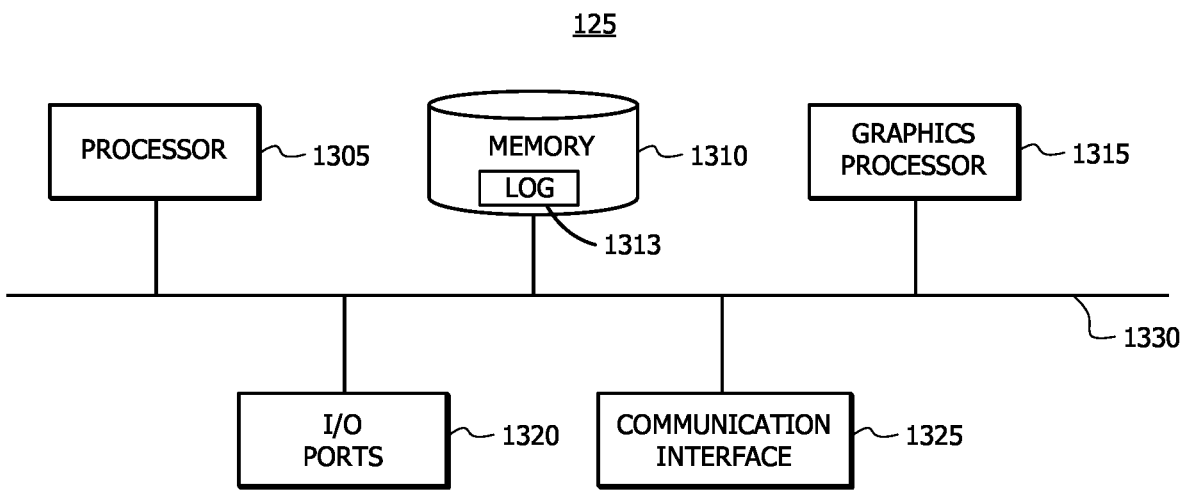
FIG. 13 illustrates one embodiment of an information handling system used with the coffee machine illustrated in FIG. 1.

FIG. 13 illustrates an embodiment of the information handling system 125 used with the coffee machine 100 illustrated in FIG. 1. Generally, information handling system 125 can be used to actuate components of the coffee machine 100. For example, information handling system 125 can be used to actuate the first robotic arm 535, the second robotic arm 540, the label machine 530, the lift 520, the ice machine 545, the coffee brewing machine 550, the blender 605, the lid disposal mechanism, the cup translating mechanism, and any combinations thereof. The information handling system 125 may be further configured to receive a plurality of beverage orders, actuate the aforementioned components to create each beverage order, monitor the location and status of each one of the plurality of beverage orders, notify each person corresponding to a received beverage order that that specific order is ready, and any combinations thereof. As seen in FIG. 13, information handling system 125 may comprise various hardware components, such as a processor 1305, a memory 1310, a graphics processor 1315, input/output ports 1320, a communication interface 1325, and a bus 1330.

Processor 1305 is any electronic circuitry, including, but not limited to microprocessors, application specific integrated circuits (ASIC), application specific instruction set processor (ASIP), and/or state machines, that communicatively couples to memory 1310 and controls the operation of information handling system 125. Processor 1305 may be 8-bit, 16-bit, 32-bit, 64-bit or of any other suitable architecture. Processor 1305 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 1305 may include other hardware that operates software to control and process information. Processor 1305 executes software stored on memory to perform any of the functions described herein. Processor 1305 controls the operation and administration of information handling system 125 by processing information received from memory 1310 and/or other computers 700. Processor 1305 may be a programmable logic device, a microcontroller, a microprocessor, any suitable processing device, or any suitable combination of the preceding. Processor 1305 is not limited to a single processing device and may encompass multiple processing devices.

Memory 1310 may store, either permanently or temporarily, data, operational software, or other information for processor 1305 in a log 1313. For example, the memory 1310 may be configured to receive and store a plurality of beverage orders in the log 1313, where the log 1313 may be updated to reflect a position of each of the plurality of beverage orders as they are being prepared. Memory 1310 may include any one or a combination of volatile or non-volatile local or remote devices suitable for storing information. For example, memory 1310 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 1310, a disk, a CD, or a flash drive. In particular embodiments, the software may include an application executable by processor 1305 to perform one or more of the functions described herein.

In certain embodiments, the information handling system 125 may or may not comprise the graphics processor 1315. Graphics processor 1315 may be any electronic circuitry, including, but not limited to microprocessors, application specific integrated circuits (ASIC), application specific instruction set processor (ASIP), and/or state machines, that receives and analyzes video data. For example, graphics processor 1315 may process video data to determine the proper signals to send to a display so that the display displays an appropriate image. Graphics processor 1315 may also process video data to identify certain characteristics (e.g., people or objects) within the video. Graphics processor 1315 may be a component of a video card that is installed in information handling system 125.

Input/output ports 1320 allow peripheral devices to connect to information handling system 125. Ports 1320 may be any suitable ports, such as, parallel ports, serial ports, optical ports, video ports, network ports, etc. Peripheral devices such as keyboards, mouses, joysticks, optical tracking devices, trackpads, touchpads, etc. can connect to information handling system 125 through ports 1320. Input and output signals are communicated between information handling system 125 and the peripheral devices through ports 1320.

Communication interface 1325 includes any suitable hardware and/or software to communicate over a network. For example, communication interface 1325 may include a mode, network card, ethernet port/controller, wireless radio/controller, cellular radio/controller, and/or universal serial bus port/controller. The bus 1330 allows components of information handling system 125 to communicate with one another. Information handling system 125 may include a bus controller that manages communication over bus 1330. While the information handling system 125 may use the bus 1330 to communicate with internal components, the statuses of these internal components may be transmitted through the communication interface 1325 to a user or nearby operator.

Information handling system 125 may use communication interface 1325 to communicate with other devices over a communication network. For example, a user may utilize a mobile device to communicate with the communication interface 1325 through a suitable application programming interface (API), wherein the API may function as an intermediary between the interface of the mobile device and the interface of the coffee machine 100 (referring to FIG. 1) (for example, the communication interface 1325). The user may communicate with the coffee machine 100 by using a software application installed on the mobile device designed for usage with the coffee machine 100, a web browser, or any other suitable platform capable of communicating with the communication interface 1325. The user may access the software application or the web browser on the mobile device at a remote location from the coffee machine 100 in order to place a beverage order. Alternatively, the user may scan a quick response ("QR") code displayed on the coffee machine 100 that may direct the user to a specific website designed for the coffee machine 100 through a web browser, where the user may then place a beverage order.

In these examples, the beverage order may be communicated to the communication interface 1325 via the API, wherein the coffee machine 100 may begin the process of preparing the beverage order without the need of having a user physically interact with the coffee machine 100 (for example, touching the primary display 500). The API may be further configured to periodically transmit information related to the progress of the coffee machine 100 preparing the beverage order to the mobile device. For example, the API may transmit to the mobile device of the user that the received beverage order is in a queue to be started, that the beverage order has started being prepared, an estimated time until the beverage order is completed, that preparation of the beverage order has been completed, and any combinations thereof.

The communication interface 1325 may further utilize IoT protocols for maintenance of the coffee machine 100 and the sub-components therein. Each of the components within the first housing 105 (referring to FIG. 1) and the second housing 110 (referring to FIG. 1) may communicate a status of that component through telemetry, or another suitable method of communication, to the communication interface 1325, which may further transmit that information to an operator through the IoT protocols. There may be associated sensors and/or transmitters communicatively coupled to each of the components that are capable of measuring a parameter of that component and transmitting that measurement to the communication interface 1325. The coffee machine 100 may communicate the status of one or more of these components to a nearby operator who may subsequently address any problems associated with the received communication. For example, transmission of a status of the overall coffee machine 100, the one or more bean tanks 115 (referring to FIG. 1), the first housing 105 (referring to FIG. 1), the cup storage compartment 525 (referring to FIG. 5), the label machine 530 (referring to FIG. 5), the ice machine 545 (referring to FIG. 5), the coffee brewing machine 550 (referring to FIG. 5), the lid storage compartment 560 (referring to FIG. 5), and combinations thereof may occur. The communication interface 1325 may continuously be sending communications via IoT protocols in real-time.

With regards to communications of the status of the overall coffee machine 100, the nearby operator may receive a communication indicating that a user failed to pick up a prepared beverage order after a pre-determined amount of time, information related to the preparation of any number of beverage orders, information related to a cleaning cycle (the scheduled time for it to occur, any errors associated with the cleaning cycle, etc.), that the communication interface 1325 is not able to connect to the API, that the primary display 500 is malfunctioning, that the first robotic arm 535 (referring to FIG. 5) and/or the second robotic arm 540 (referring to FIG. 5) is malfunctioning, that a software update is required, and any combinations thereof. The nearby operator may further receive communications related to the one or more bean tanks 115 indicating that the level of coffee beans within the one or more bean tanks 115 is below a threshold, that the second housing drawer 610 (referring to FIG. 6) is not closed, and any combinations thereof. The communication interface 1325 may further send communications related to the first housing 105, including that the contents of the first container 400 (referring to FIG. 4) are below a threshold level, that the temperature of the contents of the first container 400 is below or above acceptable threshold values, that there is blockage associated with the first container 400 prohibiting the outflow of the contents, that the nitrogen generator 410 (referring to FIG. 4) is malfunctioning and/or is empty, that the contents of any one of the plurality of secondary containers 405 (referring to FIG. 4) is below a threshold level, that the temperature of the contents of any one of the plurality of secondary containers 405 is below or above acceptable threshold values, that there is blockage associated with any one of the plurality of secondary containers 405 prohibiting the out-flow of the contents, and any combinations thereof.

The nearby operator may further receive communications related to the second housing 110 (referring to FIG. 1), including that the number of the plurality of cups disposed within the cup storage compartment 525 is below a threshold value, that the number of labels for the label machine 530 is below a threshold value, that the amount of ink used within the label machine 530 is below a threshold value, that the number of the plurality of lids disposed within the lid storage compartment is below a threshold value, and any combinations thereof. The communication interface 1325 may further monitor and send communications related to the ice machine 545 and the coffee brewing machine 550, including that temperature of the ice machine 545 is below or above acceptable threshold values, that the ice machine is malfunctioning, that the coffee brewing machine 550 is malfunctioning, that the contents of the reservoir 1225 (referring to FIG. 12) are below a threshold level, that the contents of the receptacle 1235 (referring to FIG. 12) are below a threshold level, that the one or more syrup containers 1240 are empty or below a threshold level, that the steamer 1230 (referring to FIG. 12) is malfunctioning, and any combinations thereof. With any one of the aforementioned received communications, the nearby operator may perform maintenance on the coffee machine 100 to address any potential problems of operation.

Figure 14:
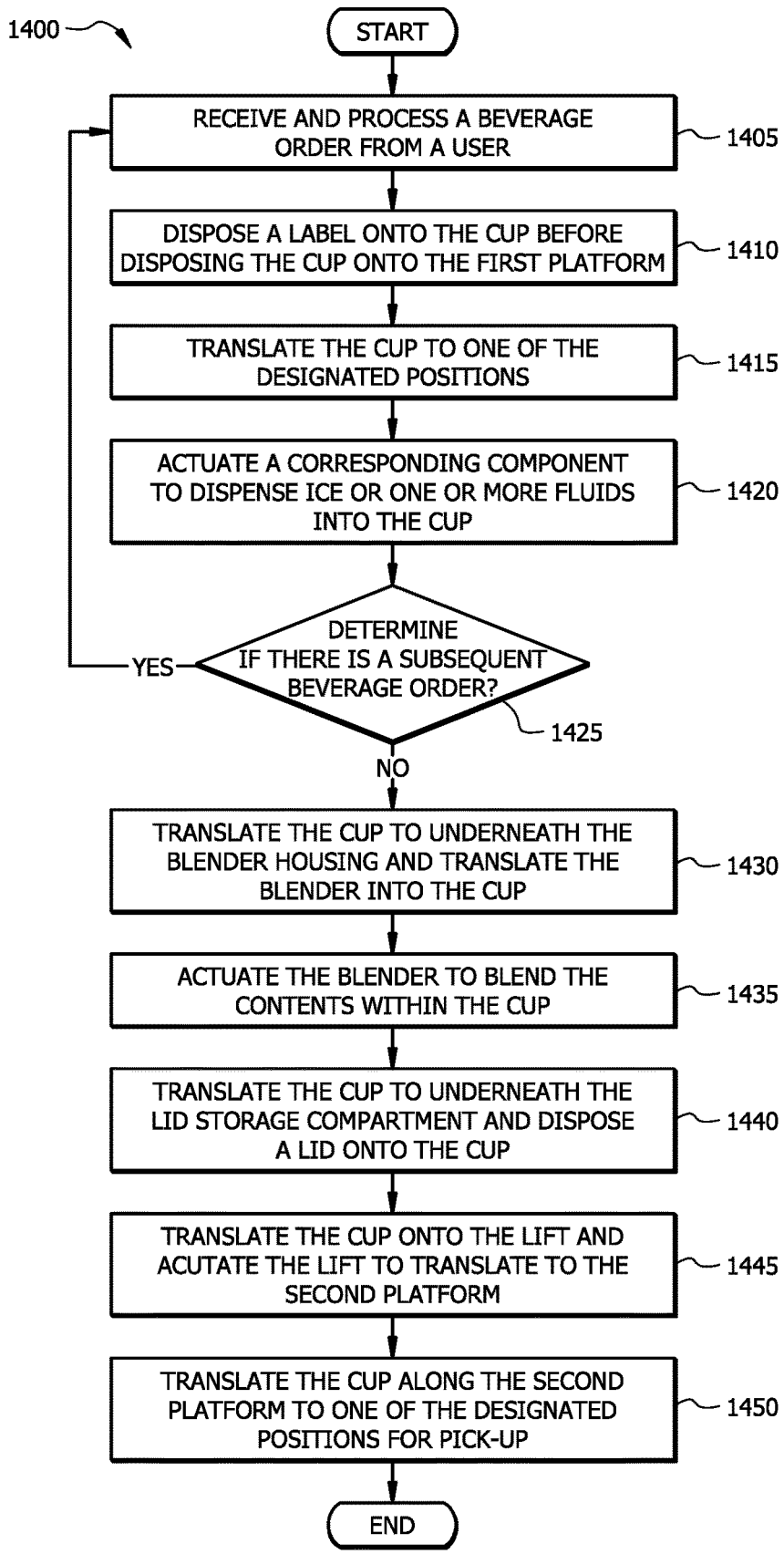
FIG. 14 illustrates an example method for operating the coffee machine illustrated in FIG. 1.

FIG. 14 illustrates an example method 1400 for operating the coffee machine 100 illustrated in FIG. 1. Generally, various components of information handling system 125 (referring to FIG. 13) may perform the method 1400.

The method 1400 may begin by receiving a first beverage order from a first user at step 1405. Receiving a first beverage order may comprise the first user manually inputting information to be designated as the first beverage order via a touchscreen incorporated into the primary display 500 (referring to FIG. 5), the first user transmitting the first beverage order to the coffee machine 100 through a network, the first user selecting information to be designated as the first beverage order within a web application, the first user orally communicating information to be designated as the first beverage order to the coffee machine 100, a camera sensing the first user and associating the first user to information for a first beverage order, and any combinations thereof. The information inputted into and/or transmitted to the coffee machine 100 may comprise the name of the user, a cup size, a base beverage (for example, coffee or tea), whether the beverage order is to be served hot or cold, additional ingredients to be added (for example, milk, sugar, or syrups), and any combinations thereof.

In one or more embodiments, the first user may use a mobile device to scan a quick response ("QR") code, barcode, or any other suitable code embedded with information that may be displayed on the primary display 500. The first user's mobile device may be directed to a webpage that consists of a menu of beverage options specific to the coffee machine 100. The first user may select at least one of the provided beverage options on the menu using the mobile device, wherein there may be an option to customize any of the provided beverage options. Once the first user has selected information to be designated as the first beverage order, the first beverage order may be transmitted by the mobile device to the information handling system 125 via a network.

In certain embodiments, the first user may take similar steps with a web application that may be accessed using a mobile device. The web application may be configured to display a menu of beverage options specific to the coffee machine 100. The first user may select at least one of the provided beverage options on the menu, wherein there may be an option to customize any of the provided beverage options. Once the first user has selected information to be designated as the first beverage order, the first beverage order may be transmitted by the mobile device to the information handling system 125 via a network.

Each received beverage order may comprise at least a first sub-step and a second sub-step, where each of the first sub-step and the second sub-step corresponds to an operation to be performed at one of the designated positions 910 (referring to FIG. 9) along the first platform 510 (referring to FIG. 5). For example, the first beverage order may be an iced coffee. In this example, the first sub-step of the first beverage order may be to dispense ice into a first cup that corresponds to the first beverage order when the first cup is at the designated position 910 underneath the ice machine 545 (referring to FIG. 5), and the second sub-step of the first beverage order may be to dispense coffee into the first cup when the first cup is at the designated position 910 underneath the coffee brewing machine 550 (referring to FIG. 5).

At step 1410, the information handling system 125 may transmit instructions to actuate the cup translating mechanism to remove a first cup from the stacked one or more cups 700 (referring to FIG. 7) in the cup storage compartment 525 (referring to FIG. 5) and to dispose the first cup about the label machine 530 (referring to FIG. 5), wherein the first beverage order may be prepared with the first cup. Once the first cup is disposed about the label machine 530, the information handling system 125 may transmit instructions and information related to the first beverage order to the label machine 530, wherein the label machine 530 may be instructed to dispose a label onto the first cup, and wherein the label may comprise information related to the first beverage order and/or the first user that placed the first beverage order. The label may display a name of the first user, an assigned order number that associates the first user to the first cup, the calculated cost of the first cup, and any combinations thereof. Once the label has been disposed onto the first cup, the information handling system 125 may transmit instructions to actuate the cup translating mechanism to dispose the first cup from the label machine 530 onto the first platform 510.

At step 1415, the information handling system 125 may transmit instructions to actuate the first robotic arm 535 (referring to FIG. 5) to at least partially close around the first cup and to translate the first cup along the first platform 510.

The processor 1305 (referring to FIG. 13) of the information handling system 125 may initiate the first sub-step of the received first beverage order by instructing the first robotic arm 535 to actuate. Depending on the received information designated as the first beverage order, the first robotic arm 535 may translate to dispose the first cup at one of the designated positions 910 underneath either the ice machine 545 or the coffee brewing machine 550. The first robotic arm 535 may then be actuated to translate horizontally along the first path 900 (referring to FIG. 9) and/or perpendicularly to the first path 900 along one of the one or more perpendicular pathways 905 (referring to FIG. 9).

At step 1420, the information handling system 125 may transmit instructions to actuate either the ice machine 545 or the coffee brewing machine 550 to begin the first sub-step of the first beverage order. If the robotic arm 535 is actuated to dispose the first cup at the designated position 910 underneath the ice machine 545, the ice machine 545 may be actuated to dispense ice into the first cup. If the robotic arm 535 is actuated to dispose the first cup at the designated position 910 underneath the coffee brewing machine 550, the coffee brewing machine 550 may be actuated to dispense one or more fluids and/or any suitable material into the first cup. The one or more fluids and/or suitable material may include coffee brewed from coffee beans contained in the one or more bean tanks 115 (referring to FIG. 1), coffee contained in one of the plurality of secondary containers 405 (referring to FIG. 4), tea contained in one of the plurality of secondary containers 405 (referring to FIG. 4), milk contained in the first container 400 (referring to FIG. 4) or the reservoir 1225 (referring to FIG. 12), sugar contained in the receptacle 1235 (referring to FIG. 12), syrup contained in the one or more syrup containers 1240 (referring to FIG. 12). In embodiments, the information handling system 125 may transmit instructions to actuate the coffee brewing machine 550 to brew coffee from the coffee beans contained in the one or more bean tanks 115 at any suitable time throughout the method 1400 up until the first cup is disposed at the designated position 910 underneath the coffee brewing machine 550.

At step 1425, the information handling system 125 may determine whether there is a subsequent beverage order from a subsequent user, such as a second beverage order placed by a second user, received by the coffee machine 100 after the first beverage order has been received or has started being prepared. If there is a subsequent beverage order received by the coffee machine 100, the subsequent beverage order may be prepared with a subsequent cup, and the method 1400 may initially repeat at least step 1405 and step 1410 for the subsequent cup. The method 1400 may further repeat step 1415 and step 1420 for the subsequent cup while the first beverage order is being prepared. The information handling system 125 may be configured to monitor the positions of the first cup and any subsequent cups as the first beverage order and/or any subsequent beverage orders are being prepared. Depending on the received information designated as the subsequent beverage order, the first robotic arm 535 may be actuated to translate to dispose the subsequent cup at one of the designated positions 910 underneath either the ice machine 545 or the coffee brewing machine 550.

For example, a second beverage order may be a plain, hot coffee. In this example, the first sub-step of the second beverage order may be to dispense coffee into a second cup that corresponds to the second beverage order when the second cup is at the designated position 910 underneath the coffee brewing machine 550, and the second sub-step of the second beverage order may be to dispose a lid onto the second cup when the second cup is at the designated position 910 underneath the lid storage compartment 560 (referring to FIG. 5).

In other embodiments, if the subsequent beverage order requires ice, the first robotic arm 535 may translate the subsequent cup to the designated position 910 under the ice machine 545, wherein the ice machine 545 may be actuated to dispense ice into the subsequent cup. If the subsequent beverage order does not require ice, the first robotic arm 535 may translate the subsequent cup past the first cup to another one of the designated positions 910 under the coffee brewing machine 550 if the coffee brewing machine 550 is continuing to dispense one or more fluids and/or suitable material into the first cup.

The processor 1305 may be configured to determine which of the first sub-steps of the first beverage order or the second beverage order terminates first. In response to determining that the first sub-step of the first beverage order has terminated first, the second sub-step of the first beverage order may be initiated by instructing the first robotic arm 535 to actuate to translate the first cup to a subsequent designated position 910 before being instructed to actuate to translate the second cup. In response to determining that the first sub-step of the second beverage order has terminated first, the second sub-step of the second beverage order may be initiated by instructing the first robotic arm 535 to actuate to translate the second cup to a subsequent designated position 910 before being instructed to actuate to translate the first cup. Each time either the first beverage order or the second beverage order completes a sub-step, the processor 1305 may transmit the position of either the first cup or the second cup, respectively, to the log 1313 (referring to FIG. 13) of the memory 1310 (referring to FIG. 13).

For example, if the second beverage order completes its first sub-step and is displaced to a subsequent designated position 910, the processor 1305 may transmit to the log 1313 that the second cup is now at that subsequent designated position 910 to perform its second sub-step. In this manner, the processor 1305 of information handling system 125 may track the status of each of the beverage orders and position the appropriate cups at different locations within the coffee machine 100 to complete each beverage order efficiently. In particular, the information handling system 125 of coffee machine 100 is able to receive multiple beverage orders at a time and in a particular sequence order, and complete the multiple beverage orders efficiently but not necessarily in the same sequence order in which the orders were taken. For example, although a first beverage order may be received by coffee machine 100 prior to the second beverage order, if the second cup associated with the second beverage order is ready to progress through a particular sub-step sooner than the first cup associated with the first beverage order, the information handling system 125 is able to progress the second cup ahead of the first cup in the sequence of operations that lead to the completion of the multiple beverage orders. Accordingly, the second beverage order may be completed prior to the first beverage order even though the second beverage order was not placed and received prior to the first beverage order. This provides a unique advantage over conventional automated coffee machines that must complete the beverage orders in the sequence with which they were received.

At step 1430, the information handling system 125 may transmit instructions to actuate the first robotic arm 535 to further translate the first cup or the subsequent cup from the designated position 910 underneath the coffee brewing machine 550 to the designated position 910 underneath the blender housing 555 (referring to FIG. 5). The first robotic arm 535 may be instructed to translate whichever of the first cup or the subsequent cup into which the coffee brewing machine 550 has earlier finished dispensing the one or more fluids and/or suitable material. Once the first cup or subsequent cup is disposed underneath the blender housing 555, the information handling system 125 may transmit instructions to translate both the blender 605 (referring to FIG. 5) and the shield 1000 (referring to FIG. 10) downwards towards the first platform 510. The blender 605 may be at least partially disposed within the interior of the first cup or subsequent cup, and the shield 1000 may be seated against the first platform 510.

At step 1435, the information handling system 125 may transmit instructions to actuate the blender 605 to blend any contents within the first cup or subsequent cup for a period of time. After the period of time has elapsed, the blender 605 and the shield 1000 may be actuated to translate upwards back into the blender housing 555.

At step 1440, the information handling system 125 may transmit instructions to actuate the first robotic arm 535 to translate the first cup or the subsequent cup from the designated position 910 underneath the blender housing 555 to the designated position 910 underneath the lid storage compartment 560. In alternate embodiments, the method 1400 may skip from the end of step 1425 to step 1440, depending on the sub-steps within each beverage order. For example, if a beverage order is plain, hot coffee, the corresponding cup would not need to have the contents blended and may skip step 1430 and 1435. The lid disposal mechanism may be actuated to remove a lid stored within the lid storage compartment 560 and to dispose the lid on top of the first cup or the subsequent cup. In certain embodiments, the lid disposal mechanism may be actuated to vertically translate downwards from the lid storage compartment to dispose the lid onto the first cup or the subsequent cup. The lid disposal mechanism may further be actuated to translate up back into the lid storage compartment 560.

The processor 1305 may be configured to determine which of the second sub-steps of the first beverage order or the second beverage order has terminated first. In response to determining that the second sub-step of the first beverage order has terminated first, the processor 1305 may instruct the first robotic arm 535 to dispose the first cup onto the lift 520 (referring to FIG. 5) and to instruct the lift 520 to translate downwards to the second platform 515 (referring to FIG. 5). In response to determining that the second sub-step of the second beverage order has terminated first, the processor 1305 may instruct the first robotic arm 535 to dispose the second cup onto the lift 520 and to instruct the lift 520 to translate downwards to the second platform 515.

At step 1445, the information handling system 125 may transmit instructions to actuate the first robotic arm 535 to translate the first cup or the subsequent cup from the designated position 910 underneath the lid storage compartment 560 onto the lift 520. Once the first cup or subsequent cup is disposed onto the lift 520, the information handling system 125 may transmit instructions to actuate the lift 520 to translate down from the first platform 510 to the second platform 515.

At step 1450, the information handling system 125 may transmit instructions to actuate the second robotic arm 540 (referring to FIG. 5) to at least partially close around the first cup or the subsequent cup and to translate the first cup or the subsequent cup from the lift 520 to one of the designated positions 910 along the second platform 515. The second robotic arm 540 may be actuated to translate horizontally along the first path 900 of the second platform 515 and/or perpendicularly to the first path 900 along one of the one or more perpendicular pathways 905 of the second platform 515 to one of the designated positions 910. Once the first cup or subsequent cup is disposed at one of the designated positions 910, the coffee machine 100 may visually and/or audibly notify the first user and/or any subsequent users that the first beverage order or subsequent beverage order is ready to be removed from the coffee machine 100. Further, the processor 1305 may transmit to the log 1313 of the memory 1310 that the corresponding first beverage order or subsequent beverage order is completed. The secondary display 505 may be actuated to display the assigned order number corresponding to the label of the first cup or subsequent cup, wherein the displayed assigned order number may vertically line up with the designated position 910 at which the first cup or subsequent cup is disposed. The disclosed method 1400 may repeat step 1405 through step 1450 for any suitable number of beverage orders. Modifications, additions, or omissions may be made to method 1400 depicted in FIG. 14. Method 1400 may include more, fewer, or other steps. For example, steps may be performed in parallel or in any suitable order.

For example, a third beverage order may be received by the information handling system 125. The third beverage order may be received after the coffee machine 100 has received the first and second beverage orders. In this example, the first beverage order and the second beverage order may be in the process of completing or may have completed their respective first sub-steps. The processor 1305 may be configured to determine whether a requisite designated position 910 for the first sub-step of the third beverage is unoccupied by the first cup and the second cup. The processor 1305 may be further configured to initiate the first sub-step of the third beverage order by instructing the first robotic arm 535 to dispose a third cup corresponding to the third beverage order to the requisite designated position that is determined to be unoccupied to start the first sub-step. The third cup may follow the method 1400 in preparation of the third beverage order, where the processor 1305 may compare the completion of the sub-steps of the third beverage to the completion of the sub-steps of the first cup and/or the second cup. As described above, depending on the relative complexity of the first, second, and third beverage orders and their respective number of sub-steps needed to complete the particular order, the first, second, and third beverage orders may be completed in a different sequence than they were received by the coffee machine 100.

Described herein are various systems and methods that provide for the preparation of a plurality of beverage orders at the same time. The coffee machine 100 may receive a first beverage order and a subsequent beverage order through any suitable means. The coffee machine 100 may be configured to prepare both the first beverage order and the subsequent beverage order simultaneously by actuating the components within the coffee machine 100 and keeping track of the position of each beverage order throughout the process of preparation. Once either of the beverage orders is completed, the coffee machine 100 may alert the corresponding user who placed the beverage order that it is completed.

The present disclosure may provide numerous advantages, such as the various technical advantages that have been described with respect to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A coffee machine, comprising:
   a first housing and a second housing, wherein the first housing comprises a storage compartment and a waste compartment, wherein the second housing is disposed on top of the first housing and comprises:
   a first platform comprising a first path configured to allow for a translation of a cup laterally and one or more perpendicular pathways disposed along the first path, wherein there is a designated position at an end of each of the one or more perpendicular pathways, wherein the first path extends longitudinally from a first terminal end to a second terminal end;
   a second platform disposed below the first platform and comprising a second path configured to allow for the translation of the cup laterally and one or more perpendicular pathways disposed along the second path, wherein the second path extends longitudinally from a third terminal end to a fourth terminal end;
   a lift disposed at a first side of the second housing and configured to translate between the first platform and the second platform;
   a first robotic arm disposed above the first platform and actionable to grab and release the cup, wherein the first robotic arm is configured to translate the cup laterally along the first path of the first platform and to a particular designated position via the one or more perpendicular pathways;
   a second robotic arm disposed between the second platform and the first platform and actionable to grab and release the cup, wherein the second robotic arm is configured to translate the cup laterally along the second path of the second platform and to the designated position via the one or more perpendicular pathways; and
   a coffee brewing machine, wherein the coffee brewing machine is actionable to dispense one or more fluids into the cup through one or more nozzles when the cup is positioned at a first designated position; and
   an information handling system comprising a memory and a processor, wherein the processor is configured to:
   instruct the first robotic arm to close around the cup;
   instruct the first robotic arm to displace the cup along the first platform to the first designated position;
   instruct the coffee brewing machine to dispense one or more fluids into the cup when the cup is positioned at the first designated position;
   instruct the first robotic arm to displace the cup along the first platform onto the lift and to release the cup;
   instruct the lift to translate between the first platform and the second platform;
   instruct the second robotic arm to close around the cup; and
   instruct the second robotic arm to displace the cup along the second platform and to release the cup.

2. The coffee machine of claim 1, wherein the second housing further comprises a cup storage compartment disposed at a second side of the second housing opposite to the first side, wherein the cup storage compartment comprises a label machine disposed within the cup storage compartment configured to attach a label to the cup.

3. The coffee machine of claim 2, wherein the second housing further comprises an ice machine actionable to dispense ice into the cup disposed beneath the ice machine when the cup is positioned at a second designated position, wherein the ice machine is disposed between the cup storage compartment and the coffee brewing machine.

4. The coffee machine of claim 1, wherein the second housing further comprises a lid storage compartment configured to house a plurality of lids and to couple one of the plurality of lids to the cup, wherein the lid storage compartment is disposed at the first side of the second housing.

5. The coffee machine of claim 1, wherein the second housing further comprises a blender housing comprising a blender and a shield that are actionable to translate vertically from above towards the first platform to position at least a portion of the blender within the cup and the shield around the cup, wherein the blender housing is disposed adjacent to the coffee brewing machine.

6. The coffee machine of claim 5, wherein the blender comprises a plurality of blades disposed at a distal end of the blender, wherein the blender is actionable to position the plurality of blades within the cup and to blend any contents within the cup.

7. The coffee machine of claim 1, further comprising a drawer disposed at a top end of the second housing configured to receive one or more bean tanks and to translate both in a first path of motion and a second path of motion that is perpendicular to the first path of motion.

8. The coffee machine of claim 1, wherein the information handling system further comprises a primary display and a secondary display, wherein the primary display is configured to display a selection of beverage options to be produced by the coffee machine, wherein the secondary display is configured to display an order number corresponding to the cup, wherein the secondary display is disposed below the primary display and separated by a glass partition.

\* \* \* \* \*